United States Patent
Appireddygari Venkataramana et al.

(10) Patent No.: US 11,416,159 B2
(45) Date of Patent: Aug. 16, 2022

(54) METHOD AND SYSTEM FOR PRIORITIZING CRITICAL DATA OBJECT STORAGE DURING BACKUP OPERATIONS

(71) Applicant: EMC IP Holding Company LLC, Hopkinton, MA (US)

(72) Inventors: Mahesh Reddy Appireddygari Venkataramana, Bangalore (IN); Chetan M. Battal, Bangalore (IN); Swaroop Shankar D. H., Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 476 days.

(21) Appl. No.: 16/398,206

(22) Filed: Apr. 29, 2019

(65) Prior Publication Data

US 2020/0341642 A1    Oct. 29, 2020

(51) Int. Cl.
*G06F 16/00* (2019.01)
*G06F 3/06* (2006.01)

(52) U.S. Cl.
CPC .............. *G06F 3/065* (2013.01); *G06F 3/064* (2013.01); *G06F 3/0619* (2013.01); *G06F 3/0659* (2013.01); *G06F 3/0673* (2013.01)

(58) Field of Classification Search
CPC .... G06F 16/178; G06F 16/2365; G06F 3/065; G06F 3/0619; G06F 3/064; G06F 3/0659;
(Continued)

(56) References Cited

U.S. PATENT DOCUMENTS

| | | | | |
|---|---|---|---|---|
| 6,085,253 A | * | 7/2000 | Blackwell | H04L 47/14 709/235 |
| 7,697,567 B2 | * | 4/2010 | Ono | H04L 47/50 370/468 |

(Continued)

OTHER PUBLICATIONS

Rao et al., "Weighted Euclidean distance based approach as a multiple attribute decision making method for plant or facility layout design selection", 2012, International Journal of Industrial Engineering Computations, vol. 3, 365-382 . . . (Year: 2012).*

(Continued)

*Primary Examiner* — Jared M Bibbee
(74) *Attorney, Agent, or Firm* — Chamberlain, Hrdlicka, White, Williams & Aughtry

(57) ABSTRACT

A method and system for prioritizing critical data object storage during backup operations. Specifically, the method and system disclosed herein entail reordering data objects, awaiting being written to storage and thus queued in one or more data object queues, in accordance with a nearest-critical based sequential order. The nearest-critical based sequential order may be derived through modified weight-based Euclidean distances calculated between adjacent data object pairs queued in any given data object queue. Further, the calculated modified weight-based Euclidean distances incorporate data criticality factors associated with the adjacent data object pairs. By reordering data objects in a nearest-critical based sequential order, critical data objects may be written into storage first, thereby avoiding possible critical data loss should a disaster occur during backup operations.

19 Claims, 11 Drawing Sheets

(58) Field of Classification Search
CPC ............... G06F 3/0673; G06F 11/1451; G06F 11/1461; G06F 11/1458
See application file for complete search history.

(56) References Cited

U.S. PATENT DOCUMENTS

| | | | | |
|---|---|---|---|---|
| 7,904,423 | B2* | 3/2011 | Vermeulen | G06F 16/184 |
| | | | | 707/626 |
| 8,463,798 | B1 | 6/2013 | Claudatos | |
| 9,171,002 | B1* | 10/2015 | Mam | G06F 3/0679 |
| 9,846,622 | B1 | 12/2017 | Roguine | |
| 2004/0240460 | A1* | 12/2004 | Hwang | H04L 49/90 |
| | | | | 370/412 |
| 2005/0177767 | A1 | 8/2005 | Furuya | |
| 2013/0138902 | A1* | 5/2013 | Haustein | G06F 3/0613 |
| | | | | 711/162 |
| 2013/0326159 | A1* | 12/2013 | Vijayan | G06F 3/0605 |
| | | | | 711/148 |
| 2014/0040573 | A1* | 2/2014 | Cherkasova | G06F 11/1446 |
| | | | | 711/162 |
| 2014/0052694 | A1* | 2/2014 | Dasari | G06F 16/23 |
| | | | | 707/654 |
| 2016/0019119 | A1 | 1/2016 | Gupta | |
| 2017/0078208 | A1* | 3/2017 | Panin | H04L 47/24 |
| 2018/0077068 | A1* | 3/2018 | Dhanabalan | H04L 47/2433 |
| 2019/0278663 | A1* | 9/2019 | Mehta | G06F 3/067 |

OTHER PUBLICATIONS

Phunchongharn et al. "File Type Classification for Adaptive Object File System", 2006, IEEE. (Year: 2006).*

Extended European Search Report issued in corresponding EP Application No. 20166271.5, dated Oct. 2, 2020 (7 pages).

Okfalisa et al., Comparative analysis of k-nearest neighbor and modified k-nearest neighbor algorithm for data classification. Comparative analysis of k-nearest neighbor and modified k-nearest neighbor algorithm for data classification, Nov. 1, 2017, pp. 294-298, 2017 (5 pages).

Extended European Search Report issued in corresponding EP Application No. 20170352.7 dated Sep. 16, 2020 (8 pages).

* cited by examiner

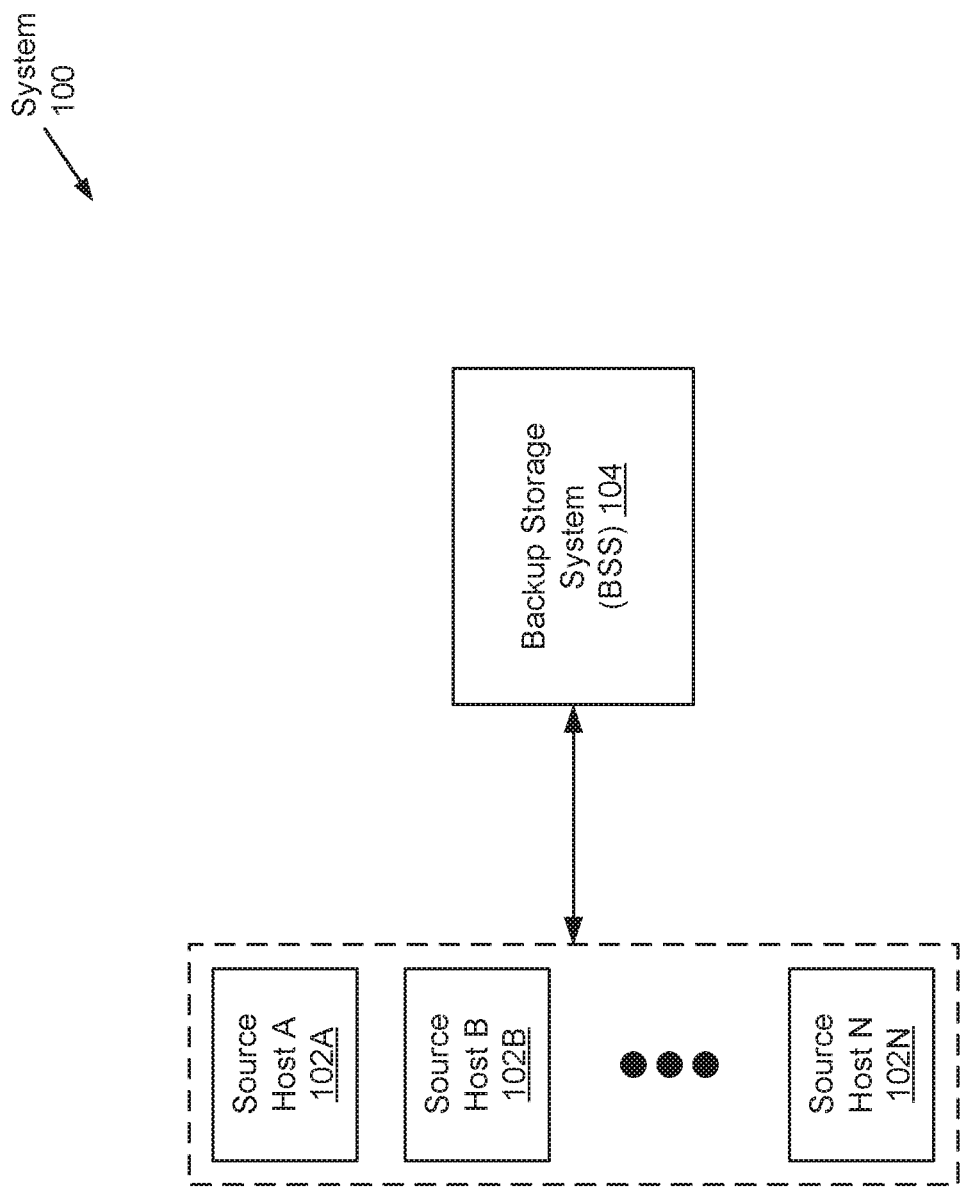

METHOD AND SYSTEM FOR PRIORITIZING CRITICAL DATA OBJECT STORAGE DURING BACKUP OPERATIONS

BACKGROUND

Existing data backup solutions lack a mechanism to determine the storing priority of data during backup operations. That is, should a disaster transpire during or before a backup operation completes, critical data may be lost while queued for storage in a backup storage array.

BRIEF DESCRIPTION OF DRAWINGS

FIG. 1 shows a system in accordance with one or more embodiments of the invention.

DETAILED DESCRIPTION

Figure 2A:
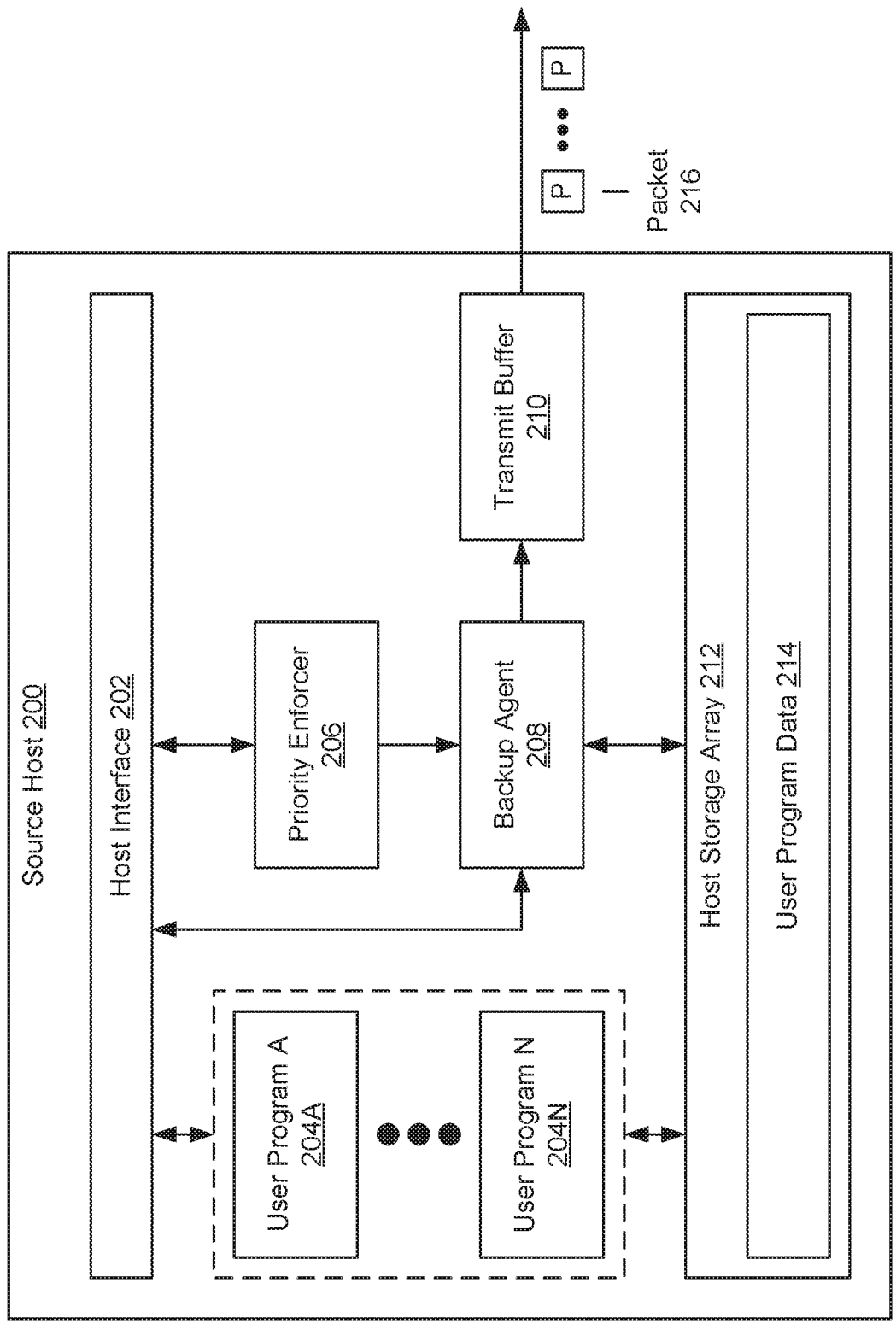
FIG. 2A shows a source host in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for prioritizing critical data object storage during backup operations. Specifically, one or more embodiments of the invention entails reordering data objects, awaiting being written to storage and thus queued in one or more data object queues, in accordance with a nearest-critical based sequential order. The nearest-critical based sequential order may be derived through modified weight-based Euclidean distances calculated between adjacent data object pairs queued in any given data object queue. Further, the calculated modified weight-based Euclidean distances incorporate data criticality factors associated with the adjacent data object pairs. By reordering data objects in a nearest-critical based sequential order, critical data objects may be written into storage first, thereby avoiding possible critical data loss should a disaster occur during backup operations.

FIG. 1 shows a system in accordance with one or more embodiments of the invention. The system (100) may include one or more source hosts (102A-102N), each operatively connected to a backup storage system (BSS) (104). Each of these components is described below.

In one embodiment of the invention, the source host(s) (102A-102N) may be directly or indirectly connected to the BSS (104) through a network (not shown) (e.g., a local area network (LAN), a wide area network (WAN) such as the Internet, a mobile network, etc.). The network may be implemented using any combination of wired and/or wireless connections. In embodiments in which the source host(s) (102A-102N) and the BSS (104) are indirectly connected, there may be other network components or systems (e.g., switches, routers, gateways, etc.) that may facilitate communications. Further, the source host(s) (102A-102N) and the BSS (104) may communicate with one another using any combination of wired and/or wireless communication protocols.

In one embodiment of the invention, each source host (102A-102N) may represent any physical computing system whereon one or more user programs (not shown) may be executing. These user programs may, for example, implement large-scale and complex data processing; and may service multiple users concurrently. Further, each source host (102A-102N) may provide and manage the allocation of various computing resources (e.g., computer processors, memory, persistent and non-persistent storage, network bandwidth, etc.) towards the execution of various processes (or tasks) that may be instantiated thereon. One of ordinary skill will appreciate that each source host (102A-102N) may perform other functionalities without departing from the scope of the invention. Examples of a source host (102A-102N) may include, but are not limited to, a desktop computer, a tablet computer, a server, a mainframe, a smartphone, or any other computing system similar to the exemplary computing system shown in FIG. 8. Source hosts (102A-102N) are described in further detail below with respect to FIGS. 2A-2C.

In one embodiment of the invention, the BSS (104) may represent a data backup, archiving, and/or disaster recovery storage system. The BSS (104) may be implemented using one or more servers (not shown). Each server may be a physical server (i.e., which may reside in a data center) or a virtual server (i.e., which may reside in a cloud computing environment). Further, in one embodiment of the invention, the BSS (104) may be implemented using one or more computing systems similar to the exemplary computing system shown in FIG. 8. The BSS (104) is described in further detail below with respect FIGS. 3A and 3B.

While FIG. 1 shows a configuration of components, other system configurations may be used without departing from the scope of the invention.

FIG. 2A shows a source host in accordance with one or more embodiments of the invention. The source host (200) described herein may operatively connect with a backup storage system (BSS) (not shown) described in FIG. 3A. Further, the source host (200) may represent a physical computing system that includes a host interface (202), one or more user programs (204A-204N), a priority enforcer (206), a backup agent (208), a transmit buffer (210), and a host storage array (212). Each of these components is described below.

In one embodiment of the invention, the host interface (202) may refer to computer hardware and/or software through which a user may interact with various components (e.g., user program(s) (204A-204N), priority enforcer (206), backup agent (208), etc.) of the source host (200). Accordingly, the host interface (202) may include functionality to: relay commands, instructions, and/or other input information from the user to one or more source host (200) components; and, conversely, present results and/or other output information from one or more source host (200) components to the user. One of ordinary skill will appreciate that the host interface (202) may perform other functionalities without departing from the scope of the invention. By way of examples, the host interface (202) may be implemented in the form of a command line interface (CLI), a graphical user interface (GUI), or any other interface design through which users may interact with the source host (200).

In one embodiment of the invention, a user program (204A-204N) may refer to a computer program that may execute on the underlying hardware of the source host (200). Specifically, a user program (204A-204N) may refer to a computer program designed and configured to perform one or more functions, tasks, and/or activities directed to aiding a user of the source host (200). Accordingly, a user program (204A-204N) may include functionality to: receive commands, instructions, and/or other input information from the host interface (202); perform one or more functions, tasks, and/or activities for which the user program (204A-204N) is designed and configured in response to receiving the aforementioned commands, instructions, and/or other input information; read and/or write (i.e., store) respective user program data (214) from/to the host storage array (212) before, while, and/or after performing the functions, tasks, and/or activities; obtain results and/or other output information from performing the functions, tasks, and/or activities; and provide the aforementioned results and/or other output information to the host interface (202). One of ordinary skill will appreciate that a user program (204A-204N) may perform other functionalities without departing from the scope of the invention. Examples of a user program (204A-204N) may include, but are not limited to, a word processor, an email client, a database client, a virtual machine, a web browser, a media player, a file viewer, an image editor, a simulator, etc.

In one embodiment of the invention, the priority enforcer (206) may refer to a computer program that may execute on the underlying hardware of the source host (200). Specifically, the priority enforcer (206) may refer to a computer program designed and configured to apply a data criticality factor to any data packet (216) awaiting transmission to a backup storage system (BSS) (see e.g., FIG. 1). Accordingly, the priority enforcer (206) may include functionality to: receive calibration instructions from the host interface (202); examine any given data packet (216), including replicated user program data (214), to identify the data type of the replicated user program data (214); match a data criticality factor corresponding to the identified data type of the replicated user program data (214); and incorporate the data criticality factor to the header information of the given data packet (216). A data packet (216) may refer to a unit of data (e.g., user program data (214)). One of ordinary skill will appreciate that the priority enforcer (206) may perform other functionalities without departing from the scope of the invention.

In one embodiment of the invention, the above-mentioned calibration instructions, received by the priority enforcer (206), may encompass user-defined mappings associating user program data (214) data types to data criticality factors. A user program data (214) data type may refer to metadata that describes a given user program data (214) and, more specifically, may refer to metadata that indicates a type of data associated with the given user program data (214). By way of examples, a data type for user program data (214) may include, but are not limited to, a database record data type, a text data type, an image data type, a virtual machine configuration data type, etc. On the other hand, a data criticality factor may refer to a numerical or categorical classification that assigns a write operation prioritization to a given user program data (214) data type. Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme.

In one embodiment of the invention, the backup agent (208) may refer to a computer program that may execute on the underlying hardware of the source host (200). Specifically, the backup agent (208) may refer to a computer program designed and configured to implement data backup operations periodically and/or on-demand. Accordingly, the backup agent (208) may include functionality to: receive commands, instructions, and/or other input information from the host interface (202); identify and replicate user program data (214), residing in the host storage array (212), based on a configuration of the backup agent (208); generate one or more data packets (216) encapsulating the replicated user program data (214); and queue the data packet(s) (216) in the transmit buffer (210). One of ordinary skill will appreciate that the backup agent (208) may perform other functionalities without departing from the scope of the invention.

In one embodiment of the invention, user program data (214), which the backup agent (208) may identify and replicate, may entail user program data (214) marked for backup, archiving, and/or disaster recovery storage. The backup agent (208) may identify certain user program data (214) to backup based on whether the impending backup operation is directed to a full data backup or an incremental data backup. A full data backup may entail replicating and backing up entire contiguous containers of data (e.g., files) regardless of whether updates or modifications have been performed on the data since a previous backup operation. On the other hand, an incremental data backup may entail replicating and backing up only the segments of a contiguous container of data that have been updated or modified since the previous backup operation.

In one embodiment of the invention, the transmit buffer (210) may refer to physical memory storage (e.g., random access memory (RAM)) wherein data packets (216) may be queued temporarily while awaiting transmission towards a destination (not shown) through a network. By way of an example, a destination of the data packets (216) may be a BSS (see e.g., FIG. 3A) whereon replicated user program data (214), which may be encapsulated by the data packets (216), may be consolidated for backup, archiving, and/or disaster recovery purposes. Further, the transmit buffer (210) may include functionality to transmit one or more data packet streams in a concurrent (or parallel) fashion. A data packet stream may refer to a collection of data packets (216) belonging to a same or common backup job. In turn, a backup job may refer to a backup operation defined by a set of information such as, for example, the data (e.g., user program data (214)) being backed up, the target location of the backup (e.g., BSS), and the time at which the backup is being performed. Additional or alternative information may define a backup job without departing from the scope of the invention.

In one embodiment of the invention, the host storage array (212) may refer to a collection of one or more physical storage devices (not shown) on which various forms of information—e.g., user program data (214)—may be consolidated. Each physical storage device may encompass non-transitory computer readable storage media on which information may be stored in whole or in part, and temporarily or permanently. By way of examples, each physical storage device may be representative of a hard disk drive (HDD), a solid state drive (SSD), a magnetic tape storage system, or network attached storage (NAS). Further, in one embodiment of the invention, the host storage array (212) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, user program data (214), which may be consolidated on the host storage array (212), may refer to any granularity of data associated with any given user program (204A-204N). User program data (214) may entail, for example, application data, user data, configuration data, metadata, or any other form of data with which one or more user programs (204A-204N) may interact.

Figure 2B:
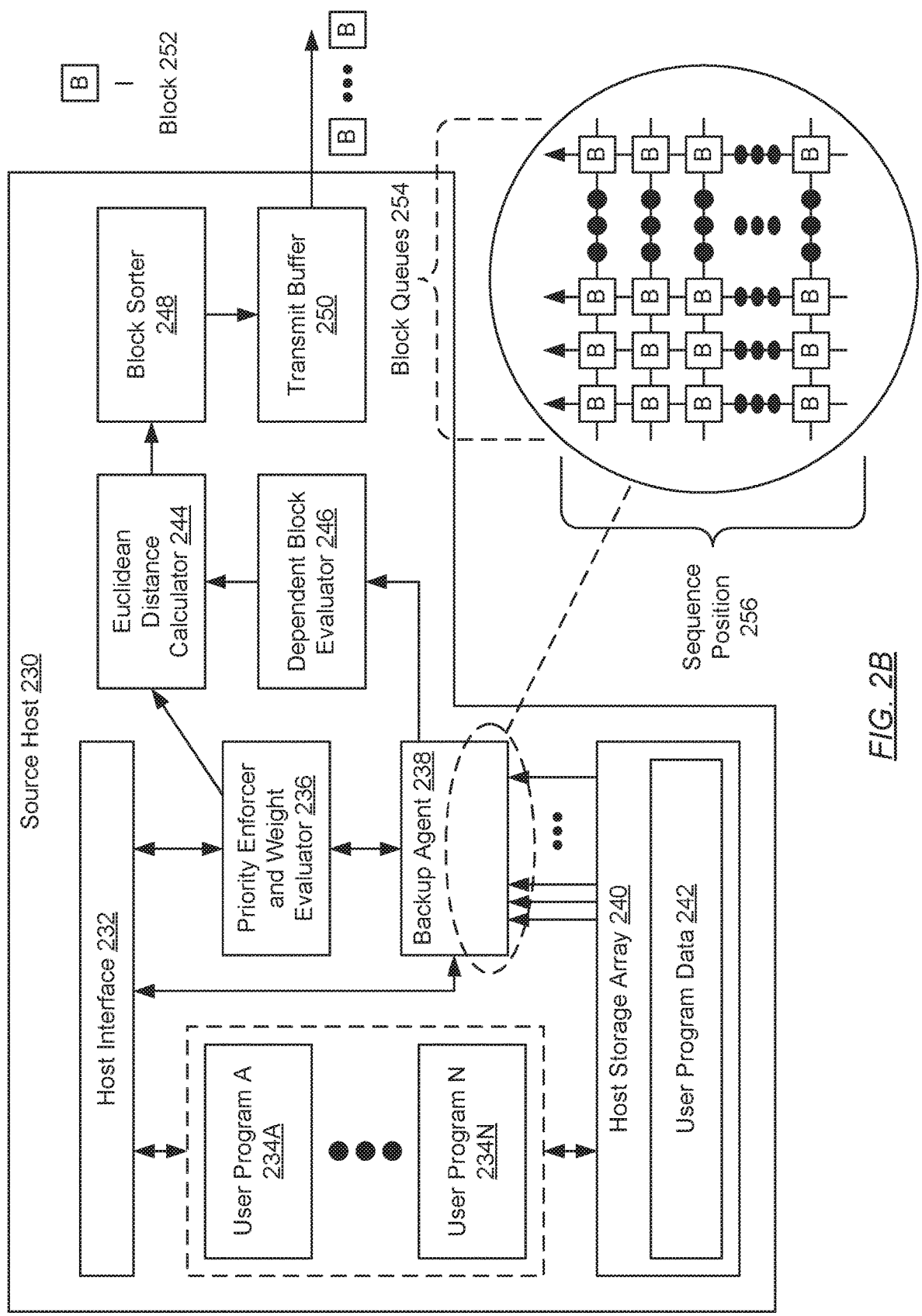
FIG. 2B shows a source host in accordance with one or more embodiments of the invention.

FIG. 2B shows a source host in accordance with one or more embodiments of the invention. The source host (230) described herein may operatively connect with the backup storage system (BSS) (not shown) described below with respect to FIG. 3B. Further, the source host (230) may represent a physical computing system that includes a host interface (232), one or more user programs (234A-234N), a priority enforcer and weight evaluator (236), backup agent (238), a host storage array (240), an Euclidean distance calculator (244), a dependent block evaluator (246), a block sorter (248), and a transmit buffer (250). Each of these components is described below.

In one embodiment of the invention, the host interface (232) may refer to computer hardware and/or software through which a user may interact with various components (e.g., user program(s) (234A-234N), priority enforcer and weight evaluator (236), backup agent (238), etc.) of the source host (230). Accordingly, the host interface (232) may include functionality to: relay commands, instructions, and/or other input information from the user to one or more source host (230) components; and, conversely, present results and/or other output information from one or more source host (230) components to the user. One of ordinary skill will appreciate that the host interface (232) may perform other functionalities without departing from the scope of the invention. By way of examples, the host interface (232) may be implemented in the form of a command line interface (CLI), a graphical user interface (GUI), or any other interface design through which users may interact with the source host (230).

In one embodiment of the invention, a user program (234A-234N) may refer to a computer program that may execute on the underlying hardware of the source host (240). Specifically, a user program (234A-234N) may refer to a computer program designed and configured to perform one or more functions, tasks, and/or activities directed to aiding a user of the source host (230). Accordingly, a user program (234A-234N) may include functionality to: receive commands, instructions, and/or other input information from the host interface (232); perform one or more functions, tasks, and/or activities for which the user program (234A-234N) is designed and configured in response to receiving the aforementioned commands, instructions, and/or other input information; read and/or write (i.e., store) respective user program data (242) from/to the host storage array (240) before, while, and/or after performing the functions, tasks, and/or activities; obtain results and/or other output information from performing the functions, tasks, and/or activities; and provide the aforementioned results and/or other output information to the host interface (232). One of ordinary skill will appreciate that a user program (234A-234N) may perform other functionalities without departing from the scope of the invention. Examples of a user program (234A-234N) may include, but are not limited to, a word processor, an email client, a database client, a virtual machine, a web browser, a media player, a file viewer, an image editor, a simulator, etc.

In one embodiment of the invention, the priority enforcer and weight evaluator (236) may refer to a computer program that may execute on the underlying hardware of the source host (230). Specifically, the priority enforcer and weight evaluator (236) may refer to a computer program designed and configured to determine a data criticality factor and, subsequently, identify a priority weight, associated with any data block (252) awaiting transmission to a backup storage system (BSS) (see e.g., FIG. 1). Accordingly, the priority enforcer and weight evaluator (236) may include functionality to: receive calibration instructions from the host interface (232); examine any given data block (252), including at least a portion of replicated user program data (242); match a data criticality factor corresponding to the identified data type of the portion of replicated user program data (242); incorporate the data criticality factor to the header information of the given data block (252); identify a priority weight for the data block (252) based on the data criticality factor;

and provide at least the priority weight for the data block (252) to the Euclidean distance calculator (244). A data block (252) may refer to a unit of data (e.g., user program data (242)) representative of a portion or subset of a single contiguous container of data (e.g., a file). One of ordinary skill will appreciate that the priority enforcer and weight evaluator (236) may perform other functionalities without departing from the scope of the invention.

In one embodiment of the invention, the above-mentioned calibration instructions, received by the priority enforcer and weight evaluator (236), may encompass user-defined mappings associating user program data (242) data types to data criticality factors. A user program data (242) data type may refer to metadata that describes a given user program data (242) and, more specifically, may refer to metadata that indicates a type of data associated with the given user program data (242). By way of examples, a data type for user program data (242) may include, but are not limited to, a database record data type, a text data type, an image data type, a virtual machine configuration data type, etc. On the other hand, a data criticality factor may refer to a numerical or categorical classification that assigns a write operation prioritization to a given user program data (242) data type. Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme. Moreover, a priority weight for any given data block (252) may refer to a numerical value (e.g., integer, float, fraction, etc.) assigned to the given data block (252) that reflects the relative importance of the given data block (252) based on the data criticality factor with which the given data block (252) is associated.

In one embodiment of the invention, the backup agent (238) may refer to a computer program that may execute on the underlying hardware of the source host (230). Specifically, the backup agent (238) may refer to a computer program designed and configured to implement data backup operations periodically and/or on-demand. Accordingly, the backup agent (238) may include functionality to: receive commands, instructions, and/or other input information from the host interface (232); identify and replicate data blocks (252) of user program data (242), residing in the host storage array (240) based on a configuration of the backup agent (238); queue any replicated data blocks (252) of user program data (252) within one or more block queues (254); and provide any replicated data blocks (252) of user program data (242) to the priority enforcer and weight evaluator (236) and/or the dependent block evaluator (246). One of ordinary skill will appreciate that the backup agent (238) may perform other functionalities without departing from the scope of the invention.

In one embodiment of the invention, user program data (242), which the backup agent (238) may identify and replicate, may entail user program data (242) marked for backup, archiving, and/or disaster recovery storage. The backup agent (238) may identify certain user program data (242) to backup based on whether the impending backup operation is directed to a full data backup or an incremental data backup. A full data backup may entail replicating and backing up all data blocks (252) representative of entire contiguous containers of data (e.g., files) regardless of whether updates or modifications have been performed on the data since a previous backup operation. On the other hand, an incremental data backup may entail replicating and backing up only the data blocks (252) of a contiguous container of data that have been updated or modified since the previous backup operation. Furthermore, when queued by the backup agent (238), the above-mentioned replicated data blocks (252) may be buffered in accordance with an arrival based queuing scheme. A queuing scheme may refer to an order in which data blocks (252) in a given block queue (254) may be arranged. The aforementioned arrival based queuing scheme subsequently arranges the data blocks (252) in a given block queue (254) in the order in which the data blocks (252) had been identified and replicated by the backup agent (238).

In one embodiment of the invention, the host storage array (240) may refer to a collection of one or more physical storage devices (not shown) on which various forms of information—e.g., user program data (242)—may be consolidated. Each physical storage device may encompass non-transitory computer readable storage media on which information may be stored in whole or in part, and temporarily or permanently. By way of examples, each physical storage device may be representative of a hard disk drive (HDD), a solid state drive (SSD), a magnetic tape storage system, or network attached storage (NAS). Further, in one embodiment of the invention, the host storage array (240) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, user program data (242), which may be consolidated on the host storage array (240), may refer to any granularity of data associated with any given user program (234A-234N). User program data (242) may entail, for example, application data, user data, configuration data, metadata, or any other form of data with which one or more user programs (234A-234N) may interact.

In one embodiment of the invention, the Euclidean distance calculator (244) may refer to a computer program that may execute on the underlying hardware of the source host (230). Specifically, the Euclidean distance calculator (244) may refer to a computer program designed and configured to determine a modified weight-based Euclidean distance between any pair of adjacent data blocks (252) queued by the backup agent (238) and, thus, awaiting transmission. Generally, a Euclidean distance refers to a straight-line distance between two data points in a Euclidean space (e.g., an n-dimensional Cartesian coordinate space). The aforementioned modified weight-based Euclidean distance may therefore refer to the straight-line distance between a given data point pair, where the relative significance of each data point, of the given data point pair, is emphasized and accounted through the integration of their respective priority weights (described above), as expressed in the following mathematical formula:

$$E_{dw} = \sqrt{\Sigma_{i,j=1}^{n} |(p_i \cdot w_p - q_j \cdot w_q)|^2},$$

where $E_{dw}$ is the modified weight-based Euclidean distance between two data points $P=\{p_1, p_2, p_3, \ldots, p_n\}$ and $Q=\{q_1, q_2, q_3, \ldots, q_n\}$; where $w_p$ is the priority weight associated with data point P; where $w_q$ is the priority weight associated with data point Q; and where n is number of dimensions in the Euclidean space wherein the data points reside.

Accordingly, in one embodiment of the invention, the Euclidean distance calculator (244) may include functionality to: receive priority weights associated with any data blocks (252) queued by the backup agent (238) from the priority enforcer and weight evaluator (236); receive stream dependency information (SDI) (described below) from the dependent block evaluator (246); map queued adjacent data block (252) pairs onto n-dimensional Euclidean space; compute modified weight-based Euclidean distances between queued adjacent data block (252) pairs that have been mapped onto the n-dimensional Euclidean space, factoring in the received priority weights and SDI (if any); and providing the computed modified weight-based Euclidean distances to the block sorter (248). SDI may refer to information that relates two or more data blocks (252) to one another. These related data blocks (252) may pertain to a unique data block stream, which may be identified through examination of at least a portion of header information appended to the data blocks (252). When accounting for SDI in the computation of the modified weight-based Euclidean distances, the Euclidean distance calculator (244) may just consider the minimum modified weight-based Euclidean distance, of all the modified weight-based Euclidean distances, involving any of the identified dependent data blocks (252) associated with the SDI. One of ordinary skill will appreciate that the Euclidean distance calculator (244) may perform other functionalities without departing from the scope of the invention.

In one embodiment of the invention, the dependent block evaluator (246) may refer to a computer program that may execute on the underlying hardware of the source host (230). Specifically, the dependent block evaluator (246) may refer to a computer program designed and configured to generate stream dependency information (SDI) (if any) (described above). Accordingly, the dependent block evaluator (246) may include functionality to: examine header information (e.g., sequence number information) appended to data blocks (252) queued by the backup agent (238), to determine whether one or more unique data block streams are among the queued data blocks (252); should at least one unique data block stream be identified, generate SDI that may identify the two or more data blocks (252) belonging to each identified unique data block stream; and provide the generated SDI to the Euclidean distance calculator (244). One of ordinary skill will appreciate that the dependent block evaluator (246) may perform other functionalities without departing from the scope of the invention.

In one embodiment of the invention, the block sorter (248) may refer to a computer program that may execute on the underlying hardware of the source host (230). Specifically, the block sorter (248) may refer to a computer program designed and configured to sort data blocks (252), queued by the data buffer (238), such that the nearest and most critical data blocks (252) in each block queue (254) are placed at the front of the block queue (254). Accordingly, the block sorter (248) may include functionality to: receive modified weight-based Euclidean distances between queued adjacent data block (252) pairs from the Euclidean distance calculator (244); rearrange the queued data blocks (252) in each block queue (254) based at least on the received modified weight-based Euclidean distances, to achieve a nearest critical based queuing scheme; and provide the rearranged, queued data blocks (252) to the transmit buffer (250). A queuing scheme may refer to an order in which data blocks (252) in a given block queue (254) may be arranged. The aforementioned nearest critical based queuing scheme subsequently arranges the data blocks (252) in a given block queue (254) such that, in ranking order, the nearest and most critical data blocks (252) occupy the front-most sequence positions (256), whereas the farthest and least critical data blocks (252) alternatively occupy the rear-most sequence positions (256). One of ordinary skill will appreciate that the block sorter (248) may perform other functionalities without departing from the scope of the invention.

In one embodiment of the invention, the transmit buffer (250) may refer to physical memory storage (e.g., random access memory (RAM)) wherein data blocks (252) may be queued temporarily while awaiting transmission towards a destination (not shown) through a network. By way of an example, a destination of the data blocks (252) may be a backup storage system (BSS) (see e.g., FIG. 3B) whereon replicated data blocks (252) of user program data (242) may be consolidated for backup, archiving, and/or disaster recovery purposes. Further, the transmit buffer (250) may include functionality to transmit one or more data block streams in a concurrent (or parallel) fashion. A data block stream may refer to a collection of data blocks (252) belonging to a same or common backup job. In turn, a backup job may refer to a backup operation defined by a set of information such as, for example, the data (e.g., user program data (242)) being backed up, the target location of the backup (e.g., BSS), and the time at which the backup is being performed. Additional or alternative information may define a backup job without departing from the scope of the invention.

Figure 2C:
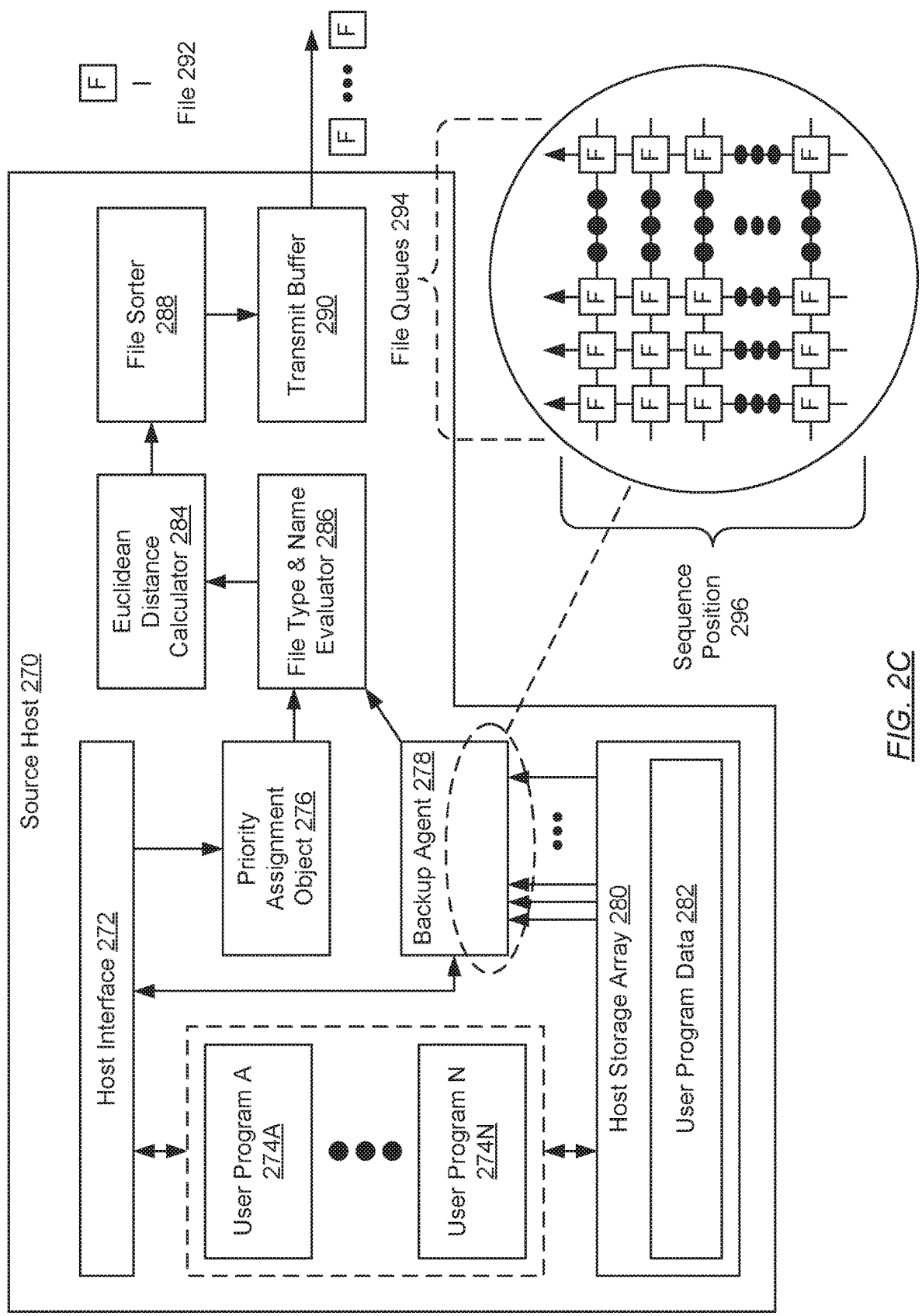
FIG. 2C shows a source host in accordance with one or more embodiments of the invention.

FIG. 2C shows a source host in accordance with one or more embodiments of the invention. The source host (270) described herein may operatively connect with the backup storage system (BSS) (not shown) described below with respect to FIG. 3B. Further, the source host (270) may represent a physical computing system that includes a host interface (272), one or more user programs (274A-274N), a priority assignment object (276), backup agent (278), a host storage array (280), an Euclidean distance calculator (284), a file type and name evaluator (286), a file sorter (288), and a transmit buffer (290). Each of these components is described below.

In one embodiment of the invention, the host interface (272) may refer to computer hardware and/or software through which a user may interact with various components (e.g., user program(s) (274A-274N), priority assignment object (276), backup agent (238), etc.) of the source host (270). Accordingly, the host interface (272) may include functionality to: relay commands, instructions, and/or other input information from the user to one or more source host (270) components; and, conversely, present results and/or other output information from one or more source host (270) components to the user. One of ordinary skill will appreciate that the host interface (272) may perform other functionalities without departing from the scope of the invention. By way of examples, the host interface (272) may be implemented in the form of a command line interface (CLI), a graphical user interface (GUI), or any other interface design through which users may interact with the source host (270).

In one embodiment of the invention, a user program (274A-274N) may refer to a computer program that may execute on the underlying hardware of the source host (270). Specifically, a user program (274A-274N) may refer to a computer program designed and configured to perform one or more functions, tasks, and/or activities directed to aiding a user of the source host (270). Accordingly, a user program (274A-274N) may include functionality to: receive commands, instructions, and/or other input information from the host interface (272); perform one or more functions, tasks, and/or activities for which the user program (274A-274N) is designed and configured in response to receiving the aforementioned commands, instructions, and/or other input information; read and/or write (i.e., store) respective user program data (282) from/to the host storage array (280) before, while, and/or after performing the functions, tasks, and/or activities; obtain results and/or other output information from performing the functions, tasks, and/or activities; and provide the aforementioned results and/or other output information to the host interface (272). One of ordinary skill will appreciate that a user program (274A-274N) may perform other functionalities without departing from the scope of the invention. Examples of a user program (274A-274N) may include, but are not limited to, a word processor, an email client, a database client, a virtual machine, a web browser, a media player, a file viewer, an image editor, a simulator, etc.

In one embodiment of the invention, the priority assignment object (276) may refer to a data structure or data object (e.g., file) that specifies user-defined mappings associating file types and/or filenames to data criticality factors. A file type may refer to metadata that describes a given data file (292) and, more specifically, may refer to metadata that indicates the file format in which user program data in the given data file (292) had been encoded for storage. Examples of file formats (or file types) may include, but are not limited to, a TXT file format for American Standard Code for Information Interchange (ASCII) or Unicode plain text data files; a MP4 file format for Moving Picture Experts Group (MPEG)-4 Part 14 multimedia data files; a PDF file format for Adobe Portable Document Formatted data files; a DOC for Microsoft Word formatted data files; and any other existing file format that may be used to encode data for storage. A filename, on the other hand, may refer to data file (292) metadata that indicates a unique name identifying and distinguishing the given data file (292) from other data files (292). Filenames may be expressed as arbitrary-length character strings encompassing any combination of characters (e.g., letters, numbers, certain symbols, etc.). Furthermore, a data criticality factor may refer to a numerical or categorical classification that assigns a route operation prioritization to a given data file (292) file type and/or filename Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme.

In one embodiment of the invention, the backup agent (278) may refer to a computer program that may execute on the underlying hardware of the source host (270). Specifically, the backup agent (278) may refer to a computer program designed and configured to implement data backup operations periodically and/or on-demand. Accordingly, the backup agent (278) may include functionality to: receive commands, instructions, and/or other input information from the host interface (272); identify and replicate data files (292) of user program data (282), residing in the host storage array (280), based on a configuration of the backup agent (278); queue any replicated data files (292) of user program data (282) within one or more file queues (294); and provide any replicated data files (292) of user program data (282) to the file type and name evaluator (286). One of ordinary skill will appreciate that the backup agent (278) may perform other functionalities without departing from the scope of the invention.

In one embodiment of the invention, user program data (282), which the backup agent (278) may identify and replicate, may entail user program data (282) marked for backup, archiving, and/or disaster recovery storage. The backup agent (278) may identify certain user program data (282) to backup based on whether the impending backup operation is directed to a full data backup or an incremental data backup. A full data backup may entail replicating and backing up all data files (282) consolidated in the host storage array (280) regardless of whether updates or modifications have been performed on the data files (282) since a previous backup operation. On the other hand, an incremental data backup may entail replicating and backing up only the data files (282) that have been updated or modified since the previous backup operation. Furthermore, when queued by the backup agent (278), the above-mentioned replicated data files (292) may be buffered in accordance with an arrival based queuing scheme. A queuing scheme may refer to an order in which data files (292) in a given file queue (294) may be arranged. The aforementioned arrival based queuing scheme subsequently arranges the data files (292) in a given file queue (294) in the order in which the data files (292) had been identified and replicated by the backup agent (278).

In one embodiment of the invention, the host storage array (280) may refer to a collection of one or more physical storage devices (not shown) on which various forms of information—e.g., user program data (282)—may be consolidated. Each physical storage device may encompass non-transitory computer readable storage media on which information may be stored in whole or in part, and temporarily or permanently. By way of examples, each physical storage device may be representative of a hard disk drive (HDD), a solid state drive (SSD), a magnetic tape storage system, or network attached storage (NAS). Further, in one embodiment of the invention, the host storage array (280) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, user program data (282), which may be consolidated on the host storage array (240), may refer to any granularity of data associated with any given user program (274A-274N). User program data (282) may entail, for example, application data, user data, configuration data, metadata, or any other form of data with which one or more user programs (274A-274N) may interact.

In one embodiment of the invention, the Euclidean distance calculator (284) may refer to a computer program that may execute on the underlying hardware of the source host (270). Specifically, the Euclidean distance calculator (284) may refer to a computer program designed and configured to determine a modified weight-based Euclidean distance between any pair of adjacent data files (292) queued by the backup agent (278) and, thus, awaiting transmission.

Generally, a Euclidean distance refers to a straight-line distance between two data points in a Euclidean space (e.g., an n-dimensional Cartesian coordinate space). The aforementioned modified weight-based Euclidean distance may therefore refer to the straight-line distance between a given data point pair, where the relative significance of each data point, of the given data point pair, is emphasized and accounted through the integration of their respective priority weights (described above), as expressed in the following mathematical formula:

$$E_{dw} = \sqrt{\Sigma_{i,j=1}^{n} |(p_i \cdot w_p - q_j \cdot w_q)|^2},$$

where $E_{dw}$ is the modified weight-based Euclidean distance between two data points $P=\{p_1, p_2, p_3, \ldots, p_n\}$ and $Q=\{q_1, q_2, q_3, \ldots, q_n\}$; where $w_p$ is the priority weight associated with data point P; where $w_q$ is the priority weight associated with data point Q; and where n is number of dimensions in the Euclidean space wherein the data points reside.

Accordingly, in one embodiment of the invention, the Euclidean distance calculator (284) may include functionality to: receive priority weights associated with any data files (292) queued by the backup agent (278) from the file type and name evaluator (286); map queued adjacent data file (292) pairs onto n-dimensional Euclidean space; compute modified weight-based Euclidean distances between queued adjacent data file (292) pairs that have been mapped onto the n-dimensional Euclidean space, factoring in the received priority weights; and providing the computed modified weight-based Euclidean distances to the file sorter (288). One of ordinary skill will appreciate that the Euclidean distance calculator (284) may perform other functionalities without departing from the scope of the invention.

In one embodiment of the invention, the file type and name evaluator (286) may refer to a computer program that may execute on the underlying hardware of the source host (270). Specifically, the file type and name evaluator (286) may refer to a computer program designed and configured to assign priority weights to data files (292) queued by the backup agent (278). Accordingly, the file type and name evaluator (286) may include functionality to: examine metadata describing any given data file (292), to identify at the file type and filename associated with the given data file (292); perform a lookup on the priority assignment object (276) using the identified file type and/or filename associated with the given data file (292); based on the lookup, obtain a data criticality factor assigned to the given data file (292) by users of the source host (270); identify a priority weight associated with the data criticality factor, thereby assigning or associating the priority weight to/with the given data file (292); and provide the priority weight, for the given data file (292), to the Euclidean distance calculator (284). A data file (292) may refer to a unit of data (e.g., user program data (282)) representative of a contiguous container of data. One of ordinary skill will appreciate that the file type and name evaluator (286) may perform other functionalities without departing from the scope of the invention.

In one embodiment of the invention, the file type and name evaluator (286) may identify priority weights associated with given data criticality factors by way of prescribed user-defined mappings. Accordingly, these mappings may associate a given data criticality factor to a given priority weight. A data criticality factor may refer to a numerical or categorical classification that assigns a write operation prioritization to a given user program data (282) file type and/or filename Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme. Moreover, a priority weight for any given data file (292) may refer to a numerical value (e.g., integer, float, fraction, etc.) assigned to the given data file (292) that reflects the relative importance of the given data file (292) based on the data criticality factor with which the given data file (292) is associated.

In one embodiment of the invention, the file sorter (288) may refer to a computer program that may execute on the underlying hardware of the source host (270). Specifically, the file sorter (288) may refer to a computer program designed and configured to sort data files (292), queued by the data buffer (278), such that the nearest and most critical data files (292) in each file queue (294) are placed at the front of the file queue (294). Accordingly, the file sorter (288) may include functionality to: receive modified weight-based Euclidean distances between queued adjacent data file (292) pairs from the Euclidean distance calculator (284); rearrange the queued data files (292) in each file queue (294) based at least on the received modified weight-based Euclidean distances, to achieve a nearest critical based queuing scheme; and provide the rearranged, queued data files (292) to the transmit buffer (290). A queuing scheme may refer to an order in which data files (292) in a given file queue (294) may be arranged. The aforementioned nearest critical based queuing scheme subsequently arranges the data files (292) in a given file queue (294) such that, in ranking order, the nearest and most critical data files (292) occupy the frontmost sequence positions (296), whereas the farthest and least critical data files (292) alternatively occupy the rearmost sequence positions (296). One of ordinary skill will appreciate that the file sorter (288) may perform other functionalities without departing from the scope of the invention.

In one embodiment of the invention, the transmit buffer (290) may refer to physical memory storage (e.g., random access memory (RAM)) wherein data files (292) may be queued temporarily while awaiting transmission towards a destination (not shown) through a network. By way of an example, a destination of the data files (282) may be a backup storage system (BSS) (see e.g., FIG. 3B) whereon replicated data files (282) of user program data (282) may be consolidated for backup, archiving, and/or disaster recovery purposes. Further, the transmit buffer (290) may include functionality to transmit one or more data file streams in a concurrent (or parallel) fashion. A data file stream may refer to a collection of data files (292) belonging to a same or common backup job. In turn, a backup job may refer to a backup operation defined by a set of information such as, for example, the data (e.g., user program data (282)) being backed up, the target location of the backup (e.g., BSS), and the time at which the backup is being performed. Additional or alternative information may define a backup job without departing from the scope of the invention.

Figure 3A:
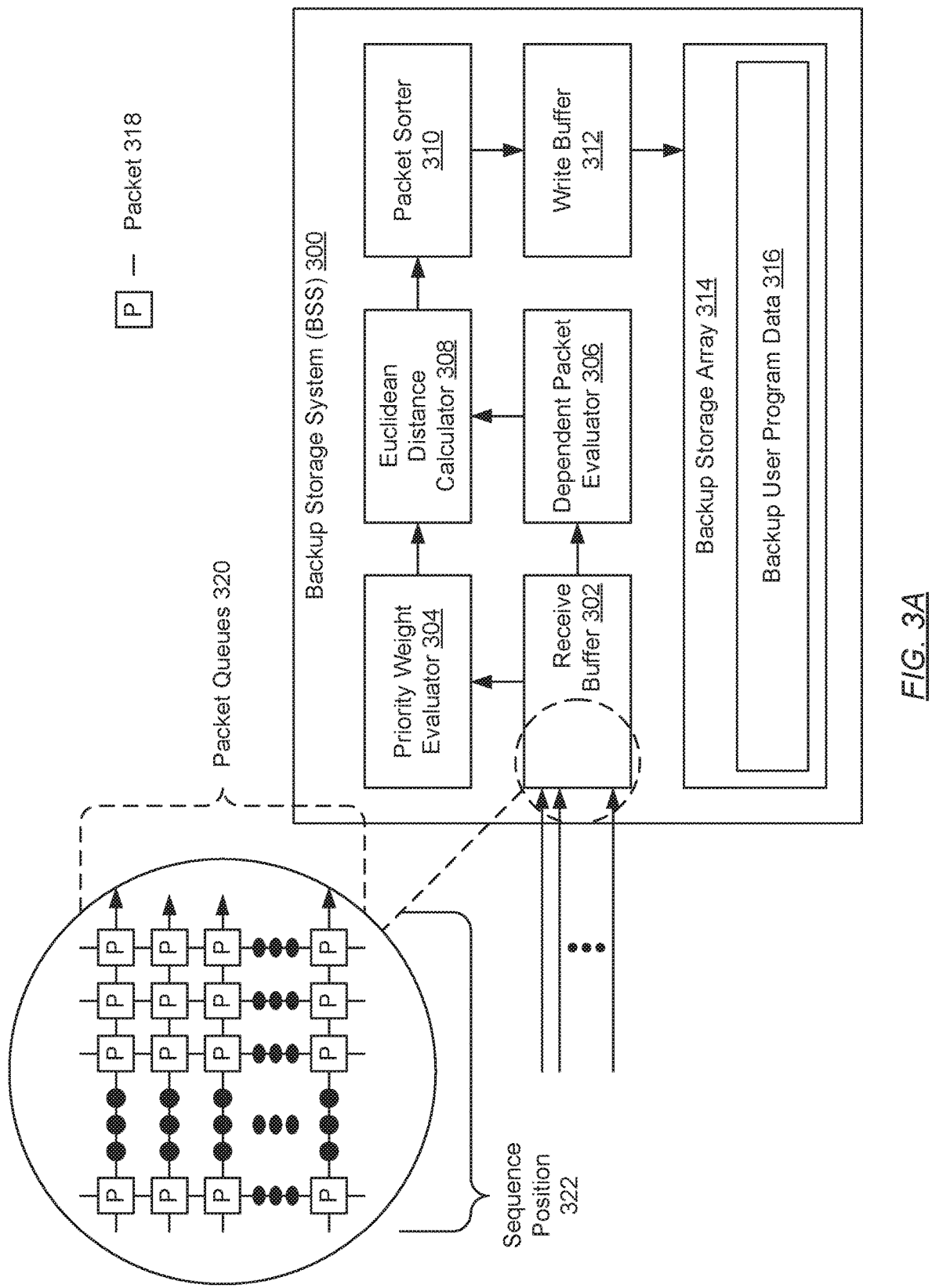
FIG. 3A shows a backup storage system in accordance with one or more embodiments of the invention.

FIG. 3A shows a backup storage system (BSS) in accordance with one or more embodiments of the invention. The BSS (300) described herein may operatively connect with the source host (not shown) described above with respect to FIG. 2A. Further, the BSS (300) may represent a data backup, archiving, and/or disaster recovery storage system that includes a receive buffer (302), a priority weight evaluator (304), a dependent packet evaluator (306), an Euclidean distance calculator (308), a packet sorter (310), a write buffer (312), and a backup storage array (314). Each of these components is described below.

In one embodiment of the invention, the receive buffer (302) may refer to physical memory storage (e.g., random access memory (RAM)) wherein data packets (318) may be queued temporarily while awaiting to be written to the backup storage array (314) for backup, archiving, and/or disaster recovery purposes. Further, the receive buffer (302) may include functionality to receive one or more data packet streams in a concurrent (or parallel) fashion. A data packet stream may refer to a collection of data packets (318) belonging to a same or common backup job. In turn, a backup job may refer to a backup operation defined by a set of information such as, for example, the data (e.g., user program data (316)) being backed up, the target location of the backup (e.g., BSS (300)), and the time at which the backup is being performed. Additional or alternative information may define a backup job without departing from the scope of the invention. Moreover, the aforementioned data packets (318) may be buffered in the receive buffer (302) in accordance with an arrival based queuing scheme. A queuing scheme may refer to an order in which data packets (318) in a given packet queue (320) may be arranged. The aforementioned arrival based queuing scheme subsequently arranges the data packets (318) in a given packet queue (320) in the order in which the data packets (318) arrived at the receive buffer (302).

In one embodiment of the invention, the priority weight evaluator (304) may refer to a computer program that may execute on the underlying hardware of the BSS (300). Specifically, the priority weight evaluator (304) may refer to a computer program designed and configured to identify a priority weight for any data packet (318) queued at the receive buffer (302). Accordingly, the priority weight evaluator (304) may include functionality to: examine header information appended to any given data packet (318), to extract a data criticality factor embedded therein; identify a priority weight for the given data packet (318) based on the extracted data criticality factor; and provide the identified priority weight for the given data packet (318) to the Euclidean distance calculator (308). A data criticality factor may refer to a numerical or categorical classification that assigns a write operation prioritization to a given user program data (316) data type. By way of examples, a data type for user program data (316) may include, but are not limited to, a database record data type, a text data type, an image data type, a virtual machine configuration data type, etc. Furthermore, data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme. Moreover, a priority weight for any given data packet (318) may refer to a numerical value (e.g., integer, float, fraction, etc.) assigned to the given data packet (318) that reflects the relative importance of the given data packet (318) based on the data criticality factor with which the given data packet (318) is associated. One of ordinary skill will appreciate that the priority weight evaluator (304) may perform other functionalities without departing from the scope of the invention.

In one embodiment of the invention, the dependent packet evaluator (306) may refer to a computer program that may execute on the underlying hardware of the BSS (300). Specifically, the dependent block evaluator (306) may refer to a computer program designed and configured to generate stream dependency information (SDI) (if any). SDI may refer to information that relates two or more data packets (318) to one another. These related data packets (318) may pertain to a unique data packet stream, which may be identified through examination of at least a portion of header information appended to the data packets (318). Accordingly, the dependent block evaluator (306) may include functionality to: examine header information (e.g., sequence number information) appended to data packets (318) queued at the receive buffer (302), to determine whether one or more unique data packet streams are among the queued data packets (318); should at least one unique data packet stream be identified, generate SDI that may identify the two or more data packets (318) belonging to each identified unique data packet stream; and provide the generated SDI to the Euclidean distance calculator (308). One of ordinary skill will appreciate that the dependent block evaluator (306) may perform other functionalities without departing from the scope of the invention.

In one embodiment of the invention, the Euclidean distance calculator (308) may refer to a computer program that may execute on the underlying hardware of the BSS (300). Specifically, the Euclidean distance calculator (308) may refer to a computer program designed and configured to determine a modified weight-based Euclidean distance between any pair of adjacent data packets (318) queued at the receive buffer (302). Generally, a Euclidean distance refers to a straight-line distance between two data points in a Euclidean space (e.g., an n-dimensional Cartesian coordinate space). The aforementioned modified weight-based Euclidean distance may therefore refer to the straight-line distance between a given data point pair, where the relative significance of each data point, of the given data point pair, is emphasized and accounted through the integration of their respective priority weights (described above), as expressed in the following mathematical formula:

$$E_{d_w} = \sqrt{\Sigma_{i,j=1}^{n} |(p_i \cdot w_p - q_j \cdot w_q)|^2},$$

where $E_{d_w}$ is the modified weight-based Euclidean distance between two data points $P=\{p_1, p_2, p_3, \ldots, p_n\}$ and $Q=\{q_1, q_2, q_3, \ldots, q_n\}$; where $w_p$ is the priority weight associated with data point P; where $w_q$ is the priority weight associated with data point Q; and where n is number of dimensions in the Euclidean space wherein the data points reside.

Accordingly, in one embodiment of the invention, the Euclidean distance calculator (308) may include functionality to: receive priority weights associated with any data packets (318) queued at the receive buffer (302) from the priority weight evaluator (304); receive stream dependency information (SDI) (if any) (described above) from the dependent packet evaluator (306); map queued adjacent data packet (318) pairs onto n-dimensional Euclidean space; compute modified weight-based Euclidean distances between queued adjacent data packet (318) pairs that have been mapped onto the n-dimensional Euclidean space, factoring in the received priority weights and SDI (if any); and providing the computed modified weight-based Euclidean distances to the packet sorter (310). When accounting for SDI in the computation of the modified weight-based Euclidean distances, the Euclidean distance calculator (308) may just consider the minimum modified weight-based Euclidean distance, of all the modified weight-based Euclidean distances, involving any of the identified dependent data packets (318) associated with the SDI. One of ordinary skill will appreciate that the Euclidean distance calculator (308) may perform other functionalities without departing from the scope of the invention.

In one embodiment of the invention, the packet sorter (310) may refer to a computer program that may execute on the underlying hardware of the BSS (300). Specifically, the packet sorter (310) may refer to a computer program designed and configured to sort data packets (318), queued at the receive buffer (302), such that the nearest and most critical data packets (318) in each packet queue (320) are placed at the front of the packet queue (320). Accordingly, the packet sorter (310) may include functionality to: receive modified weight-based Euclidean distances between queued adjacent data packet (318) pairs from the Euclidean distance calculator (308); rearrange the queued data packets (318) in each packet queue (320) based at least on the received modified weight-based Euclidean distances, to achieve a nearest critical based queuing scheme; and provide the rearranged, queued data packets (318) to the write buffer (312). A queuing scheme may refer to an order in which data packets (318) in a given packet queue (320) may be arranged. The aforementioned nearest critical based queuing scheme subsequently arranges the data packets (318) in a given packet queue (320) such that, in ranking order, the nearest and most critical data packets (318) occupy the front-most sequence positions (322), whereas the farthest and least critical data packets (318) alternatively occupy the rear-most sequence positions (322). One of ordinary skill will appreciate that the packet sorter (310) may perform other functionalities without departing from the scope of the invention.

In one embodiment of the invention, the write buffer (312) may refer to physical memory storage (e.g., random access memory (RAM)) wherein data packets (318) may be queued temporarily while awaiting being written into the backup storage array (314) for backup, archiving, and/or disaster recovery purposes. The data packets (318) queued at the write buffer (312) may be arranged per the nearest critical based queuing scheme (described above). Further, the write buffer (312) may include functionality to write or store one or more data packet streams in a concurrent (or parallel) fashion.

In one embodiment of the invention, the backup storage array (314) may refer to a collection of one or more physical storage devices (not shown) on which various forms of information—e.g., backup user program data (316)—may be consolidated. Each physical storage device may encompass non-transitory computer readable storage media on which information may be stored in whole or in part, and temporarily or permanently. By way of examples, each physical storage device may be representative of a hard disk drive (HDD), a solid state drive (SSD), a magnetic tape storage system, or network attached storage (NAS). Further, in one embodiment of the invention, the backup storage array (314) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, backup user program data (316), which may be consolidated on the backup storage array (314), may refer to copies of any granularity of data associated with any given user program (not shown) executing on a source host (see e.g., FIG. 2A). Backup user program data (316) may entail, for example, application data, user data, configuration data, metadata, or any other form of data with which one or more user programs may interact.

Figure 3B:
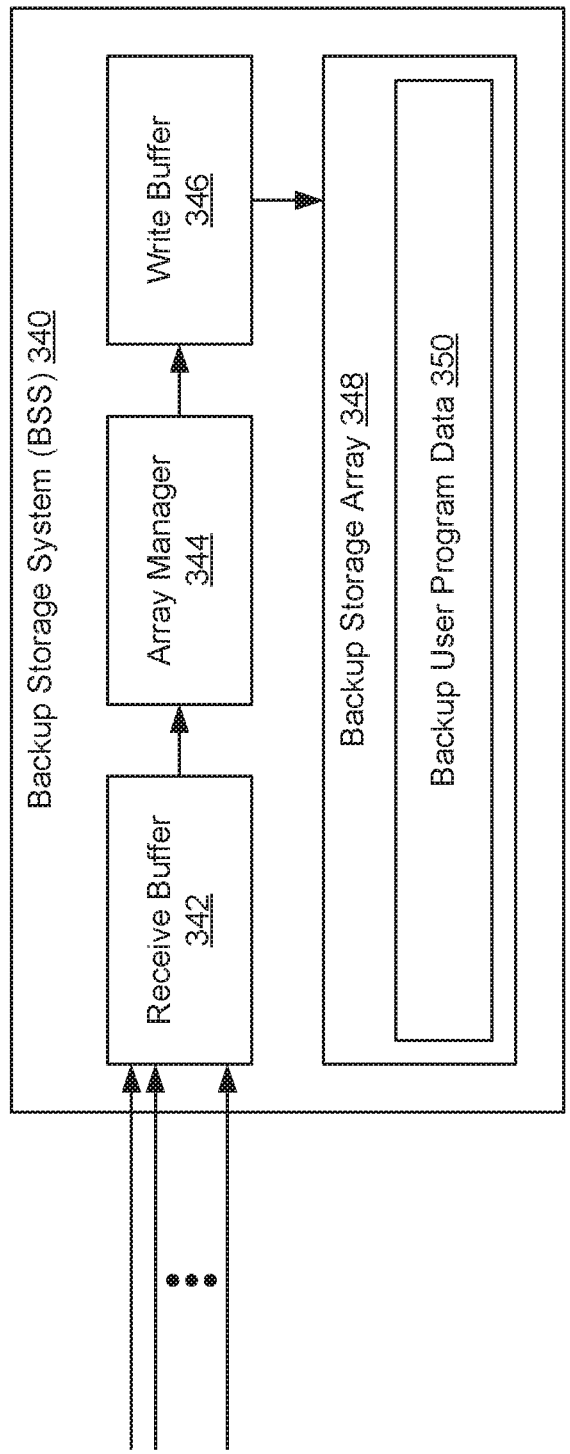
FIG. 3B shows a backup storage system in accordance with one or more embodiments of the invention.

FIG. 3B shows a backup storage system (BSS) in accordance with one or more embodiments of the invention. The BSS (340) described herein may operatively connect with the source host (not shown) described above with respect to FIG. 2B or FIG. 2C. Further, the BSS (340) may represent a data backup, archiving, and/or disaster recovery storage system that includes a receive buffer (342), an array manager (344), a write buffer (346), and a backup storage array (348). Each of these components is described below.

In one embodiment of the invention, the receive buffer (342) may refer to physical memory storage (e.g., random access memory (RAM)) wherein data objects (not shown) (e.g., data blocks or data files) may be queued temporarily while awaiting to be written to the backup storage array (348) for backup, archiving, and/or disaster recovery purposes. Further, the receive buffer (342) may include functionality to receive one or more data object streams in a concurrent (or parallel) fashion. A data object stream may refer to a collection of data objects belonging to a same or common backup job. In turn, a backup job may refer to a backup operation defined by a set of information such as, for example, the data (e.g., user program data (350)) being backed up, the target location of the backup (e.g., BSS (340)), and the time at which the backup is being performed. Additional or alternative information may define a backup job without departing from the scope of the invention.

In one embodiment of the invention, the array manager (344) may refer to a computer program that may execute on the underlying hardware of the BSS (340). Specifically, the array manager (344) may refer to a computer program designed and configured to manage the backup user program data (350) consolidated in the backup storage array (348). The array manager (344) may include further functionality to act as a relay between the receive buffer (342) and the write buffer (346). One of ordinary skill will appreciate that the array manager (344) may perform other functionalities without departing from the scope of the invention.

In one embodiment of the invention, the write buffer (346) may refer to physical memory storage (e.g., random access memory (RAM)) wherein data objects (not shown) (e.g., data blocks or data files) may be queued temporarily while awaiting being written into the backup storage array (348) for backup, archiving, and/or disaster recovery purposes. The data objects queued at the write buffer (346) may be arranged per the nearest critical based queuing scheme (described above). Further, the write buffer (346) may include functionality to write or store one or more data object streams in a concurrent (or parallel) fashion.

In one embodiment of the invention, the backup storage array (348) may refer to a collection of one or more physical storage devices (not shown) on which various forms of information—e.g., backup user program data (350)—may be consolidated. Each physical storage device may encompass non-transitory computer readable storage media on which information may be stored in whole or in part, and temporarily or permanently. By way of examples, each physical storage device may be representative of a hard disk drive (HDD), a solid state drive (SSD), a magnetic tape storage system, or network attached storage (NAS). Further, in one embodiment of the invention, the backup storage array (348) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, backup user program data (350), which may be consolidated on the backup storage array (348), may refer to copies of any granularity of data associated with any given user program (not shown) executing on a source host (see e.g., FIG. 2B or FIG. 2C). Backup user program data (350) may entail, for example, application data, user data, configuration data, metadata, or any other form of data with which one or more user programs may interact.

Figure 4:
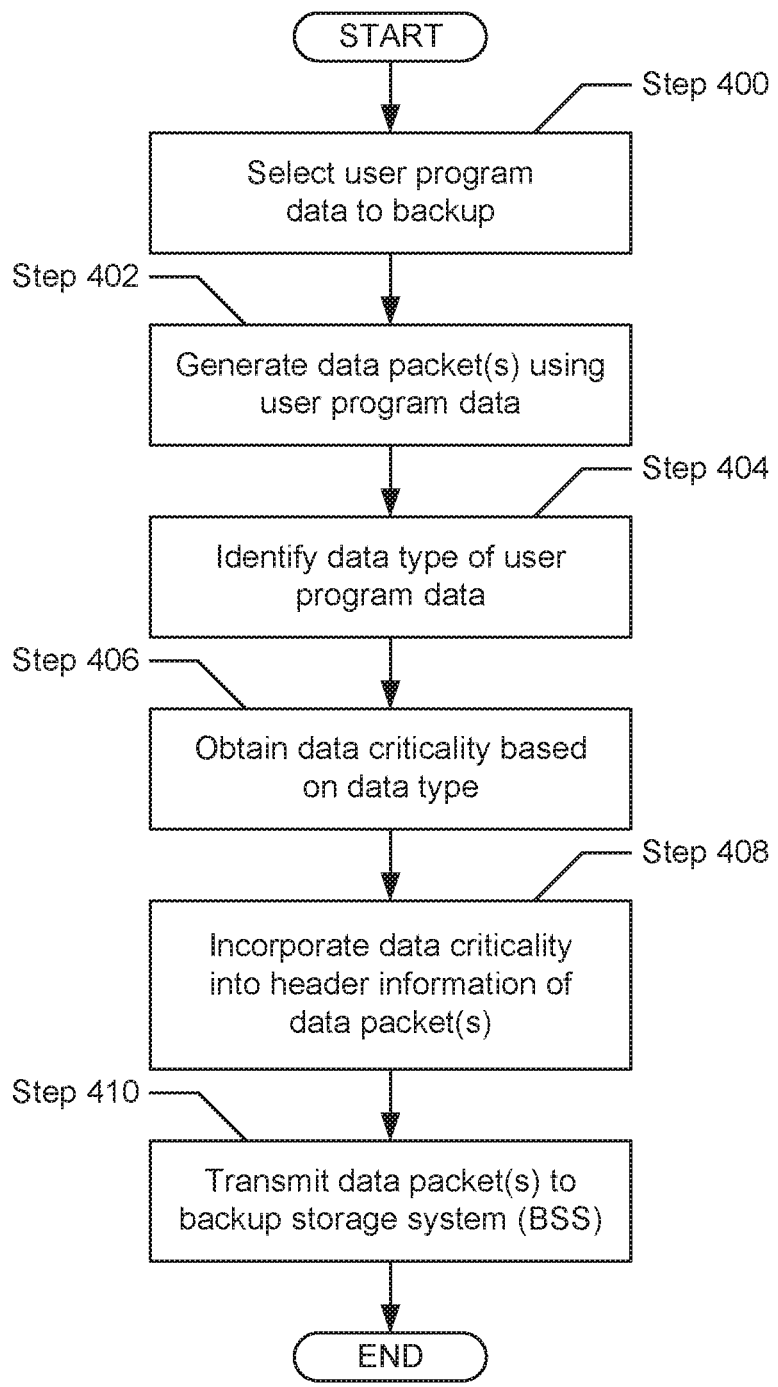
FIG. 4 shows a flowchart describing a method for enforcing data criticalities in accordance with one or more embodiments of the invention.

FIG. 4 shows a flowchart describing a method for enforcing data criticalities in accordance with one or more embodiments of the invention. The various steps outlined below may be performed by the priority enforcer (see e.g., FIG. 2A) and/or the priority enforcer and weight evaluator (see e.g., FIG. 2B) of a source host. Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, user program data is selected. In one embodiment of the invention, the selected user program data may encompass user program data marked for backup, archiving, and/or disaster recovery storage. Selection of the user program data may be based on whether the impending backup operation is directed to a full data backup or an incremental data backup. A full data backup may entail replicating and backing up entire contiguous containers of data (e.g., files) regardless of whether updates or modifications have been performed on the data since a previous backup operation. On the other hand, an incremental data backup may entail replicating and backing up only the segments of a contiguous container of data that have been updated or modified since the previous backup operation.

In Step 402, one or more data packets are generated. Specifically, in one embodiment of the invention, the granularity of user program data (selected in Step 400) may be encapsulated across one or multiple data packets. A data packet may refer to a unit of data that may be transported (or transmitted) across a network.

In Step 404, a data type associated with the user program data (selected in Step 400) is identified. In one embodiment of the invention, the data type associated with the user program data may refer to metadata that describes the user program data and, more specifically, may refer to metadata that indicates a type of data associated with the user program data. By way of examples, a data type for user program data may include, but are not limited to, a database record data type, a text data type, an image data type, a virtual machine configuration data type, etc.

In Step 406, a data criticality factor for the user program data (selected in Step 400) is obtained. In one embodiment of the invention, the data criticality factor may refer to a numerical or categorical classification that assigns a write operation prioritization to the data type associated with the user program data (identified in Step 404). Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme.

In Step 408, the data criticality factor (obtained in Step 406) is incorporated into the data packet(s) (generated in Step 402). Specifically, in one embodiment of the invention, the existing header information appended to each data packet may be modified or amended to include the data criticality factor. Thereafter, in Step 410, the data packet(s) (modified in Step 408) is/are subsequently transmitted, along a path over a network, to the backup storage system (BSS) (see e.g., FIG. 3A).

Figure 5:
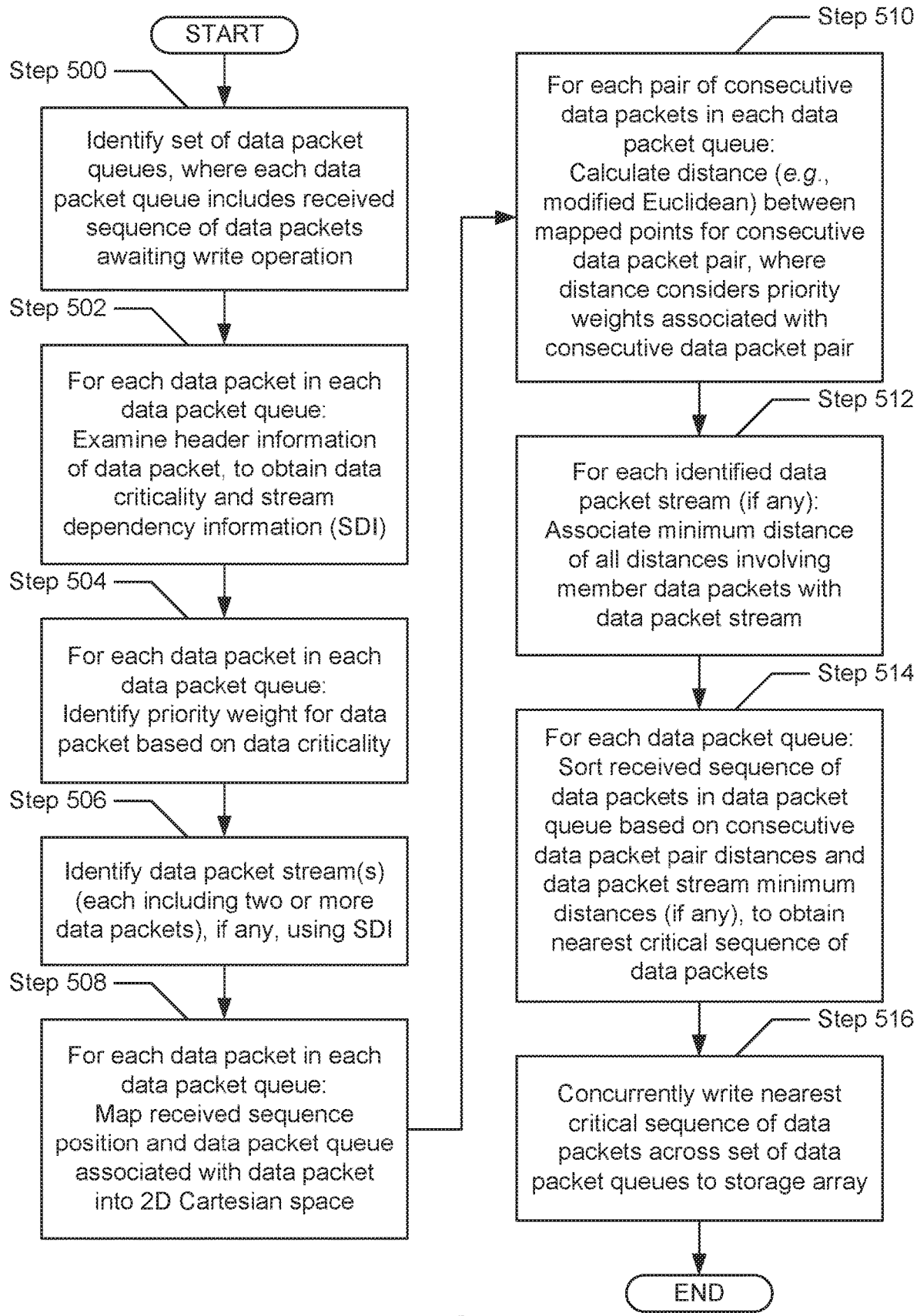
FIG. 5 shows a flowchart describing a method for prioritizing critical data packet storage during backup operations in accordance with one or more embodiments of the invention.

FIG. 5 shows a flowchart describing a method for prioritizing critical data packet storage during backup operations in accordance with one or more embodiments of the invention. The various steps outlined below may be performed by the backup storage system (BSS) portrayed in FIG. 3A. Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a set of data packet queues is identified. In one embodiment of the invention, each identified data packet queue may represent a first-in, first-out (FIFO) buffer. Further, each identified data packet queue may include a sequence of data packets, which may be awaiting to be written into a backup storage array residing on the BSS. The cardinality of (i.e., number of data packets in) the sequence of data packets in each identified data packet queue may be the same or different throughout. Moreover, each sequence of data packets may be buffered in a respective data packet queue in accordance with an arrival based queuing scheme. A queuing scheme may refer to an order in which data packets in a given data packet queue may be arranged. The aforementioned arrival based queuing scheme subsequently arranges the data packets in a given data packet queue in the order in which the data packets arrived at the BSS, or more specifically, within the respective data packet queue.

In Step 502, for each data packet queued in each data packet queue (identified in Step 500), at least a data criticality factor for the data packet is obtained. That is, in one embodiment of the invention, the header information of each data packet may be examined to at least extract the data criticality factor for the data packet. A data criticality factor may refer to a numerical or categorical classification that assigns a write operation prioritization to the data type associated with the user program data encapsulated by a given data packet. Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme. In another embodiment of the invention, stream dependency information (SDI) may also be derived from the examination of header information pertaining to each data packet. Specifically, information such as, for example, the data packet sequence number may be extracted and used to derive SDI.

In Step 504, for each data packet queued in each data packet queue (identified in Step 500), a priority weight for the data packet is identified. In one embodiment of the invention, a priority weight for any given data packet may refer to a numerical value (e.g., integer, float, fraction, etc.) that may be assigned to the given data packet, which may reflect the relative importance of the given data packet based on the data criticality factor (obtained in Step 502) with which the given data packet is associated.

In Step 506, zero or more unique data packet streams is/are identified using the SDI (obtained in Step 502). In one embodiment of the invention, SDI may refer to information that relates two or more data packets to one another. These related data packets may pertain to a unique data packet stream. A data packet stream may refer to a collection of data packets belonging to a same or common backup job. In turn, a backup job may refer to a backup operation defined by a set of information such as, for example, the data (e.g., user program data) being backed up, the target location of the backup (e.g., BSS), and the time at which the backup is being performed. Additional or alternative information may define a backup job without departing from the scope of the invention.

In Step 508, for each data packet queued in each data packet queue (identified in Step 500), the data packet is mapped into a predefined Euclidean space (e.g., a two-dimensional Cartesian coordinate space). More specifically, in one embodiment of the invention, numerical values (e.g., natural numbers) representing a received sequence position and a given data packet queue associated with a given data packet may be mapped into the abscissa (i.e., x-coordinate) and ordinate (i.e., y-coordinate), respectively, of a data point representing the given data packet in the Euclidean space. The received sequence position of the given data packet may refer to the position, along the sequence of data packets (including the given data packet) awaiting within a given data packet queue, which the given data packet occupies with respect to the front of the given data packet queue. The given data packet queue may refer to one of the above-mentioned, identified data packet queues within which the given data packet may await. The given data packet queue may be assigned a numerical value based on the relative position of the given data packet queue to other identified data packet queues.

In Step 510, for each pair of consecutive (or adjacent) data packets in each data packet queue (identified in Step 500), a distance between data points (mapped in Step 508), representative of the pair of adjacent data packets, is calculated. In one embodiment of the invention, the aforementioned distance may encompass a modified weight-based Euclidean distance. Generally, a Euclidean distance refers to a straight-line distance between two data points in a Euclidean space (e.g., an n-dimensional Cartesian coordinate space). The aforementioned modified weight-based Euclidean distance may therefore refer to the straight-line distance between a given data point pair, where the relative significance of each data point, of the given data point pair, is emphasized and accounted through the integration of their respective priority weights (identified in Step 504), as expressed in the following mathematical formula:

$$E_{dw} = \sqrt{\Sigma_{i,j=1}^{n} |(p_i \cdot w_p - q_j \cdot w_q)|^2},$$

where $E_{dw}$ is the modified weight-based Euclidean distance between two data points $P=\{p_1, p_2, p_3, \ldots, p_n\}$ and $Q=\{q_1, q_2, q_3, \ldots, q_n\}$; where $w_p$ is the priority weight associated with data point P; where $w_q$ is the priority weight associated with data point Q; and where n is number of dimensions in the Euclidean space wherein the data points reside.

In Step 512, for each data packet stream (if any had been identified in Step 506), the two or more member data packets, defining or belonging to the data packet stream, are identified. Thereafter, in one embodiment of the invention, all distances (calculated in Step 510) between adjacent data packet pairs, where at least one of the pair of data packets is a member data packet of the data packet stream, may be aggregated. Further, from this aggregation of distances, a minimum distance (i.e., a smallest distance amongst the aggregation of distances) may be identified and, subsequently, associated with the data packet stream. The remaining distances identified into the aggregation of distances (i.e., distance(s) not identified as the minimum distance) may be discarded from consideration in the following steps described hereinafter.

In Step 514, for each data packet queue (identified in Step 500), the received sequence of data packets (arranged in the arrival based queueing scheme (described above)), buffered within the data packet queue, is sorted. In one embodiment of the invention, the received sequence of data packets may be sorted (or rearranged) based on or using the distances between data packet pairs (calculated in Step 510) and the minimum distances (if any) (identified in Step 512) for one or more unique data packet streams (identified in Step 506). Further, based on the sorting, the received sequence of data packets may be rearranged into a nearest critical sequence of data packets, which may follow a nearest critical based queueing scheme. The aforementioned nearest critical based queuing scheme may arrange the data packets in a given data packet queue such that, in ranking order, the nearest and most critical data packet occupies the front-most sequence position of the given data packet queue, whereas the farthest and least critical data packet alternatively occupies the rear-most sequence position of the given data packet queue. The front-most sequence position of the given data packet queue may refer to the sequence position that may written first into the backup storage array of the BSS. Accordingly, the nearest and most critical data packet(s) in the given data packet queue gain write operation priority.

In Step 516, concurrently, the nearest critical sequence of data packets (obtained in Step 514) across all data packet queues (identified in Step 500) are written into the backup storage array. That is, in one embodiment of the invention, executed as a parallel operation, the resulting nearest critical sequence of data packets (in the above-described order), for each data packet queue, may be simultaneously consolidated (as backup user program data) in the backup storage array of the BSS.

Figure 6:
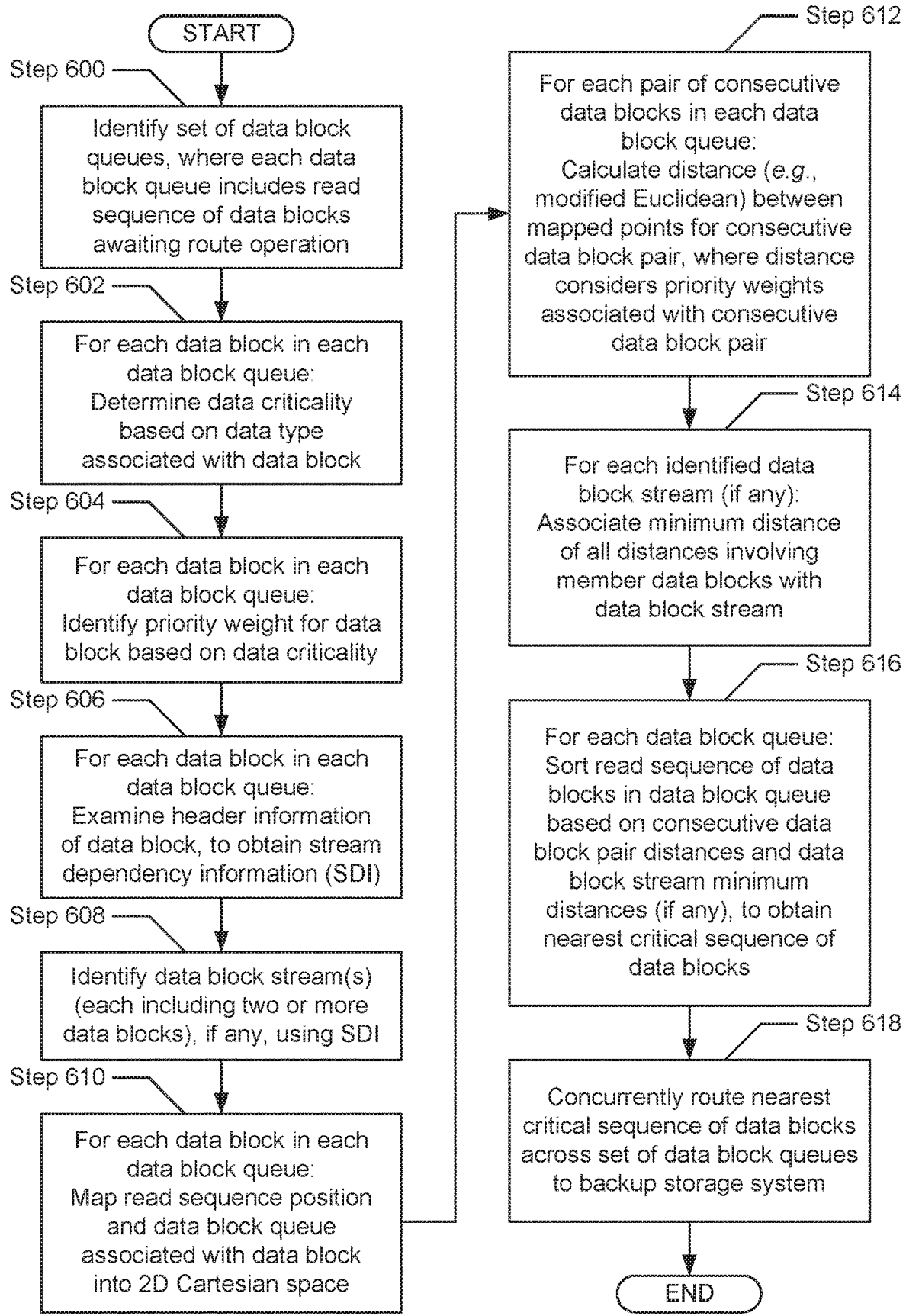
FIG. 6 shows a flowchart describing a method for prioritizing critical data block storage during backup operations in accordance with one or more embodiments of the invention.

FIG. 6 shows a flowchart describing a method for prioritizing critical data block storage during backup operations in accordance with one or more embodiments of the invention. The various steps outlined below may be performed by the source host portrayed in FIG. 2B. Further, while the various steps in the flowchart are presented and described sequentially, one of ordinary skill will appreciate that some or all steps may be executed in different orders, may be combined or omitted, and some or all steps may be executed in parallel.

Turning to FIG. 6, in Step 600, a set of data block queues is identified. In one embodiment of the invention, each identified data block queue may represent a first-in, first-out (FIFO) buffer. Further, each identified data block queue may include a sequence of data blocks, which may be awaiting transmission (or routing) to a backup storage system (BSS) (see e.g., FIG. 3B). The cardinality of (i.e., number of data blocks in) the sequence of data blocks in each identified data block queue may be the same or different throughout. Moreover, each sequence of data blocks may be buffered in a respective data block queue in accordance with an arrival based queuing scheme. A queuing scheme may refer to an order in which data blocks in a given data block queue may be arranged. The aforementioned arrival based queuing scheme subsequently arranges the data blocks in a given data block queue in the order in which the data blocks had been selected for backup by a backup agent executing on the source host.

In Step 602, for each data block queued in each data block queue (identified in Step 600), a data criticality factor for the data block is determined. That is, in one embodiment of the invention, a data type associated with data (e.g., user program data) in the data block may be identified and, subsequently, used to determine the data criticality factor for the data block. A data type of user program data may refer to metadata that describes a given user program data and, more specifically, may refer to metadata that indicates a type of data associated with the given user program data. By way of examples, a data type for user program data may include, but are not limited to, a database record data type, a text data type, an image data type, a virtual machine configuration data type, etc. Further, a data criticality factor may refer to a numerical or categorical classification that assigns a route operation prioritization to the data type associated with the user program data in the given data block. Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme.

In Step 604, for each data block queued in each data block queue (identified in Step 600), a priority weight for the data block is identified. In one embodiment of the invention, a priority weight for any given data block may refer to a numerical value (e.g., integer, float, fraction, etc.) that may be assigned to the given data block, which may reflect the relative importance of the given data block based on the data criticality factor (determined in Step 602) with which the given data block is associated. Furthermore, identification of the priority weight may entail accessing and interpreting user-defined mappings, which may associate data criticality factors to priority weights.

In Step 606, for each data block in each data block queue (identified in Step 500), stream dependency information (SDI) (if any) is obtained. In one embodiment of the invention, the SDI may be derived from the examination of header information pertaining to each data block. Specifically, information such as, for example, the data block sequence number may be extracted and used to derive SDI.

In Step 608, zero or more unique data block streams is/are identified using the SDI (obtained in Step 606). In one embodiment of the invention, SDI may refer to information that relates two or more data blocks to one another. These related data blocks may pertain to a unique data block stream. A data block stream may refer to a collection of data blocks belonging to a same or common backup job. In turn, a backup job may refer to a backup operation defined by a set of information such as, for example, the data (e.g., user program data) being backed up, the target location of the backup (e.g., BSS), and the time at which the backup is being performed. Additional or alternative information may define a backup job without departing from the scope of the invention.

In Step 610, for each data block queued in each data block queue (identified in Step 600), the data block is mapped into a predefined Euclidean space (e.g., a two-dimensional Cartesian coordinate space). More specifically, in one embodiment of the invention, numerical values (e.g., natural numbers) representing a received sequence position and a given data block queue associated with a given data block may be mapped into the abscissa (i.e., x-coordinate) and ordinate (i.e., y-coordinate), respectively, of a data point representing the given data block in the Euclidean space. The received sequence position of the given data block may refer to the position, along the sequence of data blocks (including the given data block) awaiting within a given data block queue, which the given data block occupies with respect to the front of the given data block queue. The given data block queue may refer to one of the above-mentioned, identified data block queues within which the given data block may await. The given data block queue may be assigned a numerical value based on the relative position of the given data block queue to other identified data block queues.

In Step 612, for each pair of consecutive (or adjacent) data blocks in each data block queue (identified in Step 600), a distance between data points (mapped in Step 610), representative of the pair of adjacent data blocks, is calculated. In one embodiment of the invention, the aforementioned distance may encompass a modified weight-based Euclidean distance. Generally, a Euclidean distance refers to a straight-line distance between two data points in a Euclidean space (e.g., an n-dimensional Cartesian coordinate space). The aforementioned modified weight-based Euclidean distance may therefore refer to the straight-line distance between a given data point pair, where the relative significance of each data point, of the given data point pair, is emphasized and accounted through the integration of their respective priority weights (identified in Step 604), as expressed in the following mathematical formula:

$$E_{dw} = \sqrt{\Sigma_{i,j=1}^{n} |(p_i \cdot w_p - q_j \cdot w_q)|^2},$$

where $E_{dw}$ is the modified weight-based Euclidean distance between two data points $P=\{p_1, p_2, p_3, \ldots, p_n\}$ and $Q=\{q_1, q_2, q_3, \ldots, q_n\}$; where $w_p$ is the priority weight associated with data point P; where $w_q$ is the priority weight associated with data point Q; and where n is number of dimensions in the Euclidean space wherein the data points reside.

In Step 614, for each data block stream (if any had been identified in Step 608), the two or more member data blocks, defining or belonging to the data block stream, are identified. Thereafter, in one embodiment of the invention, all distances (calculated in Step 612) between adjacent data block pairs, where at least one of the pair of data blocks is a member data block of the data block stream, may be aggregated. Further, from this aggregation of distances, a minimum distance (i.e., a smallest distance amongst the aggregation of distances) may be identified and, subsequently, associated with the data block stream. The remaining distances identified into the aggregation of distances (i.e., distance(s) not identified as the minimum distance) may be discarded from consideration in the following steps described hereinafter.

In Step 616, for each data block queue (identified in Step 600), the received sequence of data blocks (arranged in the arrival based queueing scheme (described above)), buffered within the data block queue, is sorted. In one embodiment of the invention, the received sequence of data blocks may be sorted (or rearranged) based on or using the distances between data block pairs (calculated in Step 612) and the minimum distances (if any) (identified in Step 614) for one or more unique data block streams (identified in Step 608). Further, based on the sorting, the received sequence of data blocks may be rearranged into a nearest critical sequence of data blocks, which may follow a nearest critical based queueing scheme. The aforementioned nearest critical based queuing scheme may arrange the data blocks in a given data block queue such that, in ranking order, the nearest and most critical data block occupies the front-most sequence position of the given data block queue, whereas the farthest and least critical data block alternatively occupies the rear-most sequence position of the given data block queue. The front-most sequence position of the given data block queue may refer to the sequence position that may be transmitted (or routed) first to the BSS. Accordingly, the nearest and most critical data blocks(s) in the given data block queue gain route operation priority.

In Step 618, concurrently, the nearest critical sequence of data blocks (obtained in Step 616) across all data block queues (identified in Step 600) are transmitted to the BSS. That is, in one embodiment of the invention, executed as a parallel operation, the resulting nearest critical sequence of data blocks (in the above-described order), for each data block queue, may be simultaneously transmitted or routed to the BSS.

Figure 7:
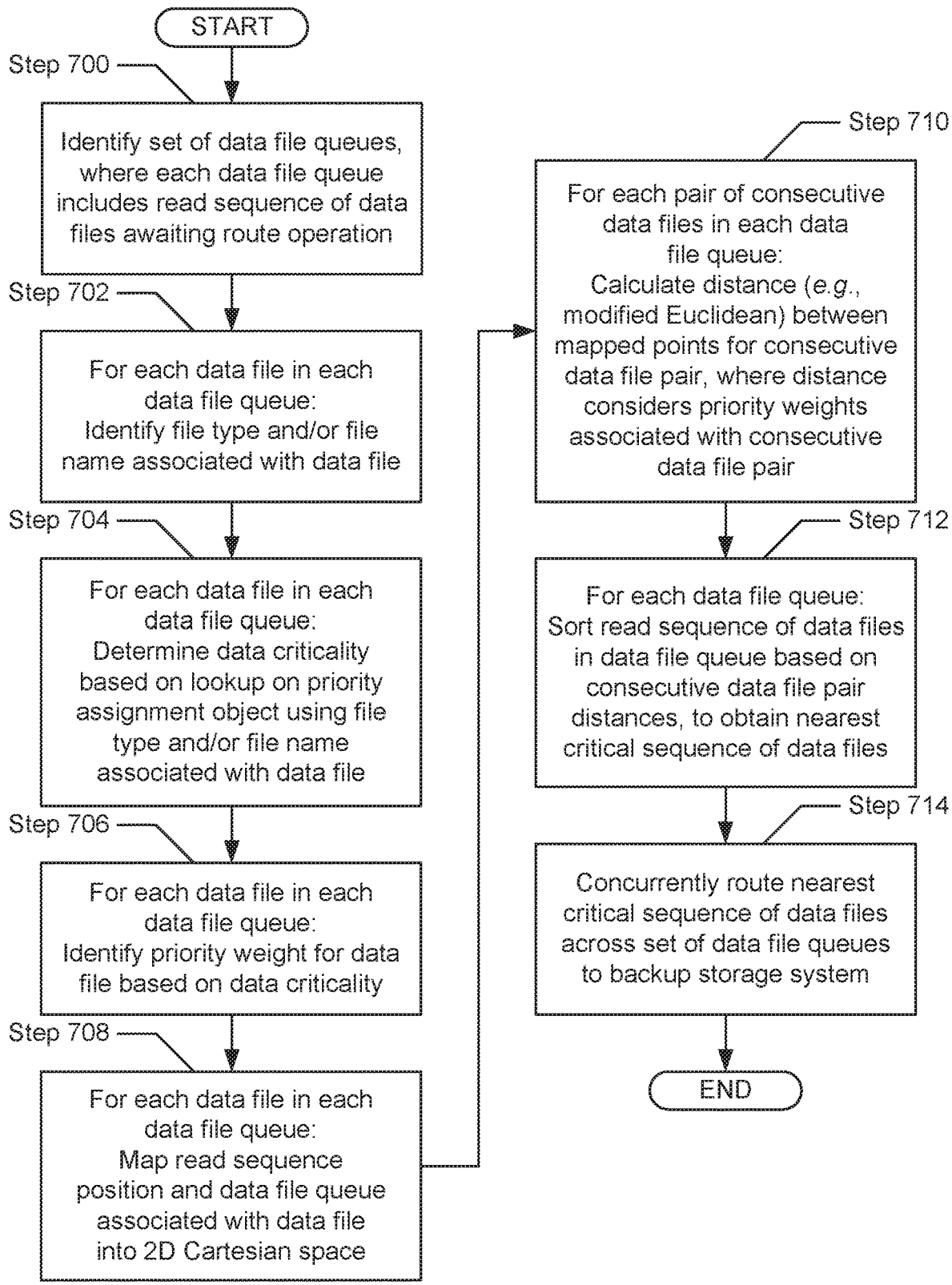
FIG. 7 shows a flowchart describing a method for prioritizing critical data file storage during backup operations in accordance with one or more embodiments of the invention.

FIG. 7 shows a flowchart describing a method for prioritizing critical data file storage during backup operations in accordance with one or more embodiments of the invention. The various steps outlined below may be performed by the source host portrayed in FIG. 2C. Further, while the various steps in the flowchart are presented and described sequentially, one of ordinary skill will appreciate that some or all steps may be executed in different orders, may be combined or omitted, and some or all steps may be executed in parallel.

Turning to FIG. 7, in Step 700, a set of data file queues is identified. In one embodiment of the invention, each identified data file queue may represent a first-in, first-out (FIFO) buffer. Further, each identified data file queue may include a sequence of data files, which may be awaiting transmission (or routing) to a backup storage system (BSS) (see e.g., FIG. 3B). The cardinality of (i.e., number of data files in) the sequence of data files in each identified data file queue may be the same or different throughout. Moreover, each sequence of data files may be buffered in a respective data file queue in accordance with an arrival based queuing scheme. A queuing scheme may refer to an order in which data files in a given data file queue may be arranged. The aforementioned arrival based queuing scheme subsequently arranges the data files in a given data file queue in the order in which the data files had been selected for backup by a backup agent executing on the source host.

In Step 702, for each data file queued in each data file queue (identified in Step 700), a file type and/or filename associated with the data file is/are identified. In one embodiment of the invention, a file type may refer to metadata that describes a given data file and, more specifically, may refer to metadata that indicates the file format in which user program data in the given data file had been encoded for storage. Examples of file formats (or file types) may include, but are not limited to, a TXT file format for American Standard Code for Information Interchange (ASCII) or Unicode plain text data files; a MP4 file format for Moving Picture Experts Group (MPEG)-4 Part 14 multimedia data files; a PDF file format for Adobe Portable Document Formatted data files; a DOC for Microsoft Word formatted data files; and any other existing file format that may be used to encode data for storage. A filename, on the other hand, may refer to data file metadata that indicates a unique name identifying and distinguishing the given data file from other data files. Filenames may be expressed as arbitrary-length character strings encompassing any combination of characters (e.g., letters, numbers, certain symbols, etc.).

In Step 704, for each data file queued in each data file queue (identified in Step 700), a data criticality factor for the data file is determined. That is, in one embodiment of the invention, the file type and/or filename (identified in Step 702) may be used to determine the data criticality factor for the data file. More specifically, a lookup may be performed on a the priority assignment object using the identified file type and/or filename, to obtain the data criticality factor. The aforementioned priority assignment object may refer to a data structure or data object (e.g., file) that specifies user-defined mappings associating file types and/or filenames to data criticality factors. Furthermore, a data criticality factor may refer to a numerical or categorical classification that assigns a route operation prioritization to a given data file. Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme.

In Step 706, for each data file queued in each data file queue (identified in Step 700), a priority weight for the data file is identified. In one embodiment of the invention, a priority weight for any given data file may refer to a numerical value (e.g., integer, float, fraction, etc.) that may be assigned to the given data file, which may reflect the relative importance of the given data file based on the data criticality factor (determined in Step 704) with which the given data file is associated. Furthermore, identification of the priority weight may entail accessing and interpreting user-defined mappings, which may associate data criticality factors to priority weights.

In Step 708, for each data file queued in each data file queue (identified in Step 700), the data file is mapped into a predefined Euclidean space (e.g., a two-dimensional Cartesian coordinate space). More specifically, in one embodiment of the invention, numerical values (e.g., natural numbers) representing a received sequence position and a given data file queue associated with a given data file may be mapped into the abscissa (i.e., x-coordinate) and ordinate (i.e., y-coordinate), respectively, of a data point representing the given data file in the Euclidean space. The received sequence position of the given data file may refer to the position, along the sequence of data files (including the given data file) awaiting within a given data file queue, which the given data file occupies with respect to the front of the given data file queue. The given data file queue may refer to one of the above-mentioned, identified data file queues within which the given data file may await. The given data file queue may be assigned a numerical value based on the relative position of the given data file queue to other identified data file queues.

In Step 710, for each pair of consecutive (or adjacent) data files in each data file queue (identified in Step 700), a distance between data points (mapped in Step 708), representative of the pair of adjacent data files, is calculated. In one embodiment of the invention, the aforementioned distance may encompass a modified weight-based Euclidean distance. Generally, a Euclidean distance refers to a straight-line distance between two data points in a Euclidean space (e.g., an n-dimensional Cartesian coordinate space). The aforementioned modified weight-based Euclidean distance may therefore refer to the straight-line distance between a given data point pair, where the relative significance of each data point, of the given data point pair, is emphasized and accounted through the integration of their respective priority weights (identified in Step 604), as expressed in the following mathematical formula:

$$E_{dw} = \sqrt{\Sigma_{i,j=1}^{n} |(p_i \cdot w_p - q_j \cdot w_q)|^2},$$

where $E_{dw}$ is the modified weight-based Euclidean distance between two data points $P=\{p_1, p_2, p_3, \ldots, p_n\}$ and $Q=\{q_1, q_2, q_3, \ldots, q_n\}$; where $w_p$ is the priority weight associated with data point P; where $w_q$ is the priority weight associated with data point Q; and where n is number of dimensions in the Euclidean space wherein the data points reside.

In Step 712, for each data file queue (identified in Step 700), the received sequence of data files (arranged in the arrival based queueing scheme (described above)), buffered within the data file queue, is sorted. In one embodiment of the invention, the received sequence of data files may be sorted (or rearranged) based on or using the distances between data file pairs (calculated in Step 710). Further, based on the sorting, the received sequence of data files may be rearranged into a nearest critical sequence of data files, which may follow a nearest critical based queueing scheme. The aforementioned nearest critical based queuing scheme may arrange the data files in a given data file queue such that, in ranking order, the nearest and most critical data file occupies the front-most sequence position of the given data file queue, whereas the farthest and least critical data file alternatively occupies the rear-most sequence position of the given data file queue. The front-most sequence position of the given data file queue may refer to the sequence position that may be transmitted (or routed) first to the BSS. Accordingly, the nearest and most critical data files(s) in the given data file queue gain route operation priority.

In Step 714, concurrently, the nearest critical sequence of data files (obtained in Step 712) across all data file queues (identified in Step 700) are transmitted to the BSS. That is, in one embodiment of the invention, executed as a parallel operation, the resulting nearest critical sequence of data files (in the above-described order), for each data file queue, may be simultaneously transmitted or routed to the BSS.

Figure 8:
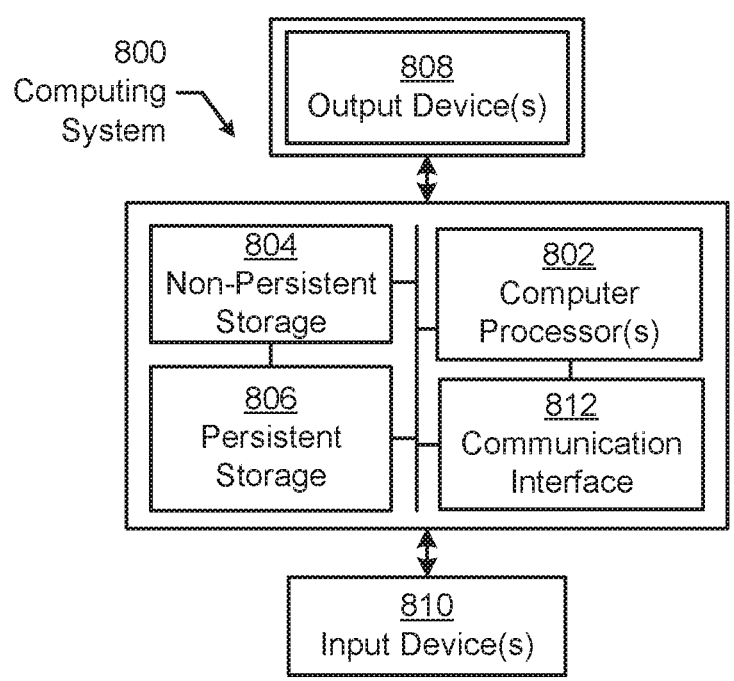
FIG. 8 shows a computing system in accordance with one or more embodiments of the invention.

FIG. 8 shows a computing system in accordance with one or more embodiments of the invention. The computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a central processing unit (CPU) and/or a graphics processing unit (GPU). The computing system (800) may also include one or more input devices (810), such as a touchscreen, keyboard, mouse, microphone, touchpad, electronic pen, or any other type of input device. Further, the communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

In one embodiment of the invention, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for consolidating data objects, comprising:
    identifying a first data object queue comprising a first set of data objects awaiting consolidation, wherein the first set of data objects is arranged according to a first queueing scheme, and wherein awaiting consolidation comprises awaiting route operations to a backup storage system;
    mapping, respectively, the first set of data objects to a first set of data points in a coordinate space;
    identifying a first set of data point pairs from the first set of data points;
    identifying a set of priority weights for the first set of data objects based on a set of data criticality factors;
    calculating a distance between each data point pair of the first set of data point pairs, to obtain a first set of distances, wherein a subset of a set of priority weights are used when calculating the distance between each data point pair, to obtain the first set of distances;
    sorting the first set of data objects based at least on the first set of distances, wherein the first set of data objects become arranged according to a second queueing scheme; and
    consolidating the first set of data objects in order of the second queueing scheme.

2. The method of claim 1, wherein each data point pair, of the first set of data point pairs, map to a pair of adjacent data objects queued according to the first queueing scheme in the first data object queue.

3. The method of claim 1, wherein the second queuing scheme prioritizes consolidation of critical data objects first.

4. The method of claim 1, wherein the first set of data objects is one selected from a group consisting of a set of data blocks and a set of data files.

5. The method of claim 1, wherein awaiting consolidation comprises awaiting write operations into a backup storage array.

6. The method of claim 5, wherein the first set of data objects is a set of data packets.

7. The method of claim 1, wherein the distance calculated between each data point pair is a modified weight-based Euclidean distance.

8. The method of claim 1, further comprising:
    prior to obtaining the first set of distances:
        examining header information in each data object of the first set of data objects, to obtain the set of data criticality factors,
        wherein the first set of data objects is one selected from a group consisting of a set of data packets and a set of data blocks.

9. The method of claim 1, further comprising:
    prior to obtaining the first set of distances:
        performing a lookup on a priority assignment object using at least one selected from a group consisting of a file type and a filename associated with each data object of the first set of data objects, to obtain the set of data criticality factors, wherein the first set of data objects is a set of data files.

10. The method of claim 1, further comprising:

while concurrently processing the first set of data objects:
identifying a second data object queue comprising a second set of data objects awaiting consolidation, wherein the second set of data objects is arranged according to the first queueing scheme;
mapping, respectively, the second set of data objects to a second set of data points in the coordinate space;
identifying a second set of data point pairs from the second set of data points;
calculating the distance between each data point pair of the second set of data point pairs, to obtain a second set of distances;
sorting the second set of data objects based at least on the second set of distances, wherein the second set of data objects become arranged according to the second queueing scheme; and
consolidating the second set of data objects in order of the second queueing scheme.

11. A system, comprising:

a computer processor programmed to:
identify a data object queue comprising a set of data objects awaiting consolidation, wherein the set of data objects is arranged according to a first queueing scheme, and wherein awaiting consolidation comprises awaiting route operations to the backup storage system;
map, respectively, the set of data objects to a set of data points in a coordinate space;
identify a set of data point pairs from the set of data points;
identify a set of priority weights for the first set of data objects based on a set of data criticality factors;
calculate a distance between each data point pair of the set of data point pairs, to obtain a set of distances, wherein a subset of a set of priority weights are used when calculating the distance between each data point pair, to obtain the set of distances;
sort the set of data objects based at least on the set of distances, wherein the set of data objects become arranged according to a second queueing scheme; and
consolidate the set of data objects in order of the second queueing scheme.

12. The system of claim 11, further comprising:

a backup storage system comprising the computer processor and a backup storage array, wherein awaiting consolidation comprises awaiting write operations into the backup storage array.

13. The system of claim 12, further comprising:

a plurality of source hosts operatively connected to the backup storage system, wherein the set of data objects originate from at least one source host of the plurality of source hosts.

14. The system of claim 11, further comprising:

a source host comprising the computer processor, and operatively connected to a backup storage system.

15. A non-transitory computer readable medium (CRM) comprising computer readable program code, which when executed by a computer processor, enable the computer processor to:

identify a data object queue comprising a set of data objects awaiting consolidation, wherein the set of data objects is arranged according to a first queueing scheme, and wherein awaiting consolidation comprises awaiting route operations to the backup storage system;
map, respectively, the set of data objects to a set of data points in a coordinate space;
identify a set of data point pairs from the set of data points;
identify, a set of priority weights for the first set of data objects based on a set of data criticality factors;
calculate a distance between each data point pair of the set of data point pairs, to obtain a set of distances, wherein a subset of a set of priority weights are used when calculating the distance between each data point pair, to obtain the set of distances;
sort the set of data objects based at least on the set of distances, wherein the set of data objects become arranged according to a second queueing scheme; and
consolidate the set of data objects in order of the second queueing scheme.

16. The non-transitory CRM of claim 15, wherein each data point pair, of the set of data point pairs, map to a pair of adjacent data objects queued according to the first queueing scheme in the data object queue.

17. The non-transitory CRM of claim 15, wherein the second queuing scheme prioritizes consolidation of critical data objects first.

18. The non-transitory CRM of claim 15, wherein the distance calculated between each data point pair is a modified weight-based Euclidean distance.

19. The non-transitory CRM of claim 15, wherein the set of data objects is one selected from a group consisting of a set of data packets, a set of data blocks, and a set of data files.

* * * * *